United States Patent
Igarashi et al.

(10) Patent No.: US 9,791,933 B2
(45) Date of Patent: Oct. 17, 2017

(54) PROJECTION TYPE IMAGE DISPLAY APPARATUS, IMAGE PROJECTING METHOD, AND COMPUTER PROGRAM

(71) Applicant: SONY CORPORATION, Tokyo (JP)

(72) Inventors: Masaya Igarashi, Chiba (JP); Kentarou Kunikane, Kanagawa (JP); Naomasa Takahashi, Chiba (JP); Hideo Nagasaka, Kanagawa (JP); Jun Kimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 144 days.

(21) Appl. No.: 13/908,807

(22) Filed: Jun. 3, 2013

(65) Prior Publication Data

US 2013/0328766 A1  Dec. 12, 2013

(30) Foreign Application Priority Data

Jun. 12, 2012  (JP) .................. 2012-132658

(51) Int. Cl.
| | |
|---|---|
| G09G 5/00 | (2006.01) |
| G09G 5/02 | (2006.01) |
| G06F 3/01 | (2006.01) |
| G06F 3/042 | (2006.01) |
| G06F 3/0488 | (2013.01) |

(52) U.S. Cl.
CPC ............ *G06F 3/017* (2013.01); *G06F 3/0425* (2013.01); *G06F 3/04883* (2013.01)

(58) Field of Classification Search
CPC .... G06F 3/017; G06F 3/0425; G06F 3/04483; G06F 3/0304; G06F 3/011; G06K 9/00355; H04B 10/116; H04B 10/11
See application file for complete search history.

(56) References Cited

U.S. PATENT DOCUMENTS

| | | | |
|---|---|---|---|
| 2008/0088740 A1* | 4/2008 | Kondo | H04N 5/44591 348/556 |
| 2008/0089587 A1* | 4/2008 | Kim | G06F 3/017 382/190 |
| 2009/0190046 A1* | 7/2009 | Kreiner et al. | 348/789 |
| 2010/0182481 A1* | 7/2010 | Kobayashi et al. | 348/333.11 |
| 2011/0141009 A1* | 6/2011 | Izumi | 345/156 |
| 2011/0197147 A1* | 8/2011 | Fai | G06F 1/1639 715/753 |
| 2011/0216075 A1* | 9/2011 | Shigeta et al. | 345/473 |
| 2011/0242298 A1* | 10/2011 | Bathiche et al. | 348/54 |
| 2011/0249019 A1* | 10/2011 | Chen | 345/593 |
| 2012/0281129 A1* | 11/2012 | Wang | H04N 5/23219 348/333.01 |
| 2012/0299876 A1* | 11/2012 | De Leon et al. | 345/175 |
| 2013/0086472 A1* | 4/2013 | Chiu | 715/273 |

FOREIGN PATENT DOCUMENTS

| | | |
|---|---|---|
| JP | 2007-013810 A | 1/2007 |
| JP | 2010-015553 A | 1/2010 |

* cited by examiner

*Primary Examiner* — Vijay Shankar
*Assistant Examiner* — Nan-Ying Yang
(74) *Attorney, Agent, or Firm* — Chip Law Group

(57) ABSTRACT

Disclosed herein is a projection type image display apparatus, including: a projecting portion projecting an input image on an image projected body; a camera portion photographing the image projected body; a display control block controlling display of a projected image projected by the projecting portion; and a gesture recognizing unit recognizing a gesture manipulation of a user contained in the image photographed by the camera portion.

18 Claims, 18 Drawing Sheets

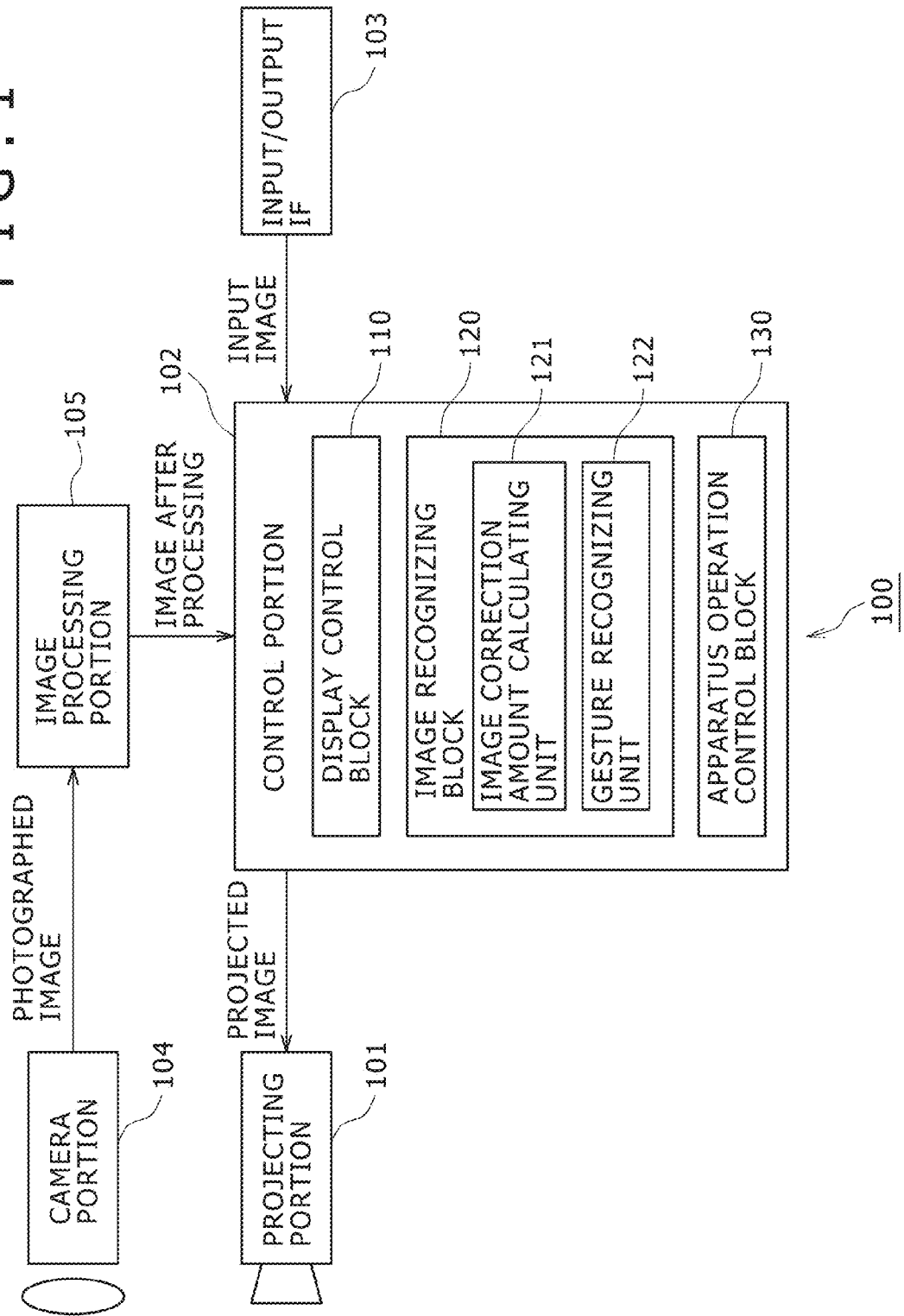

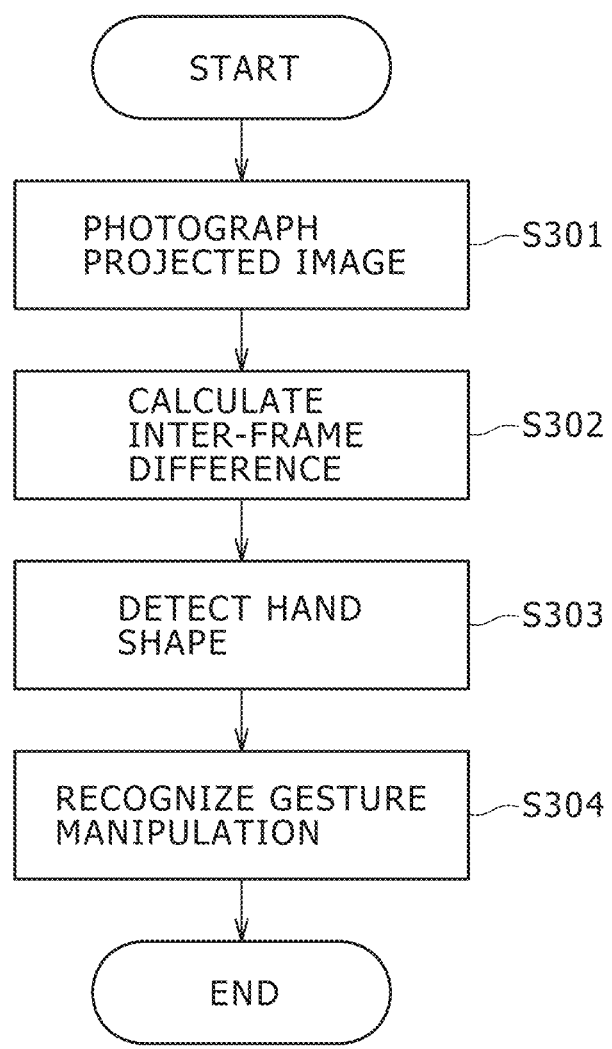

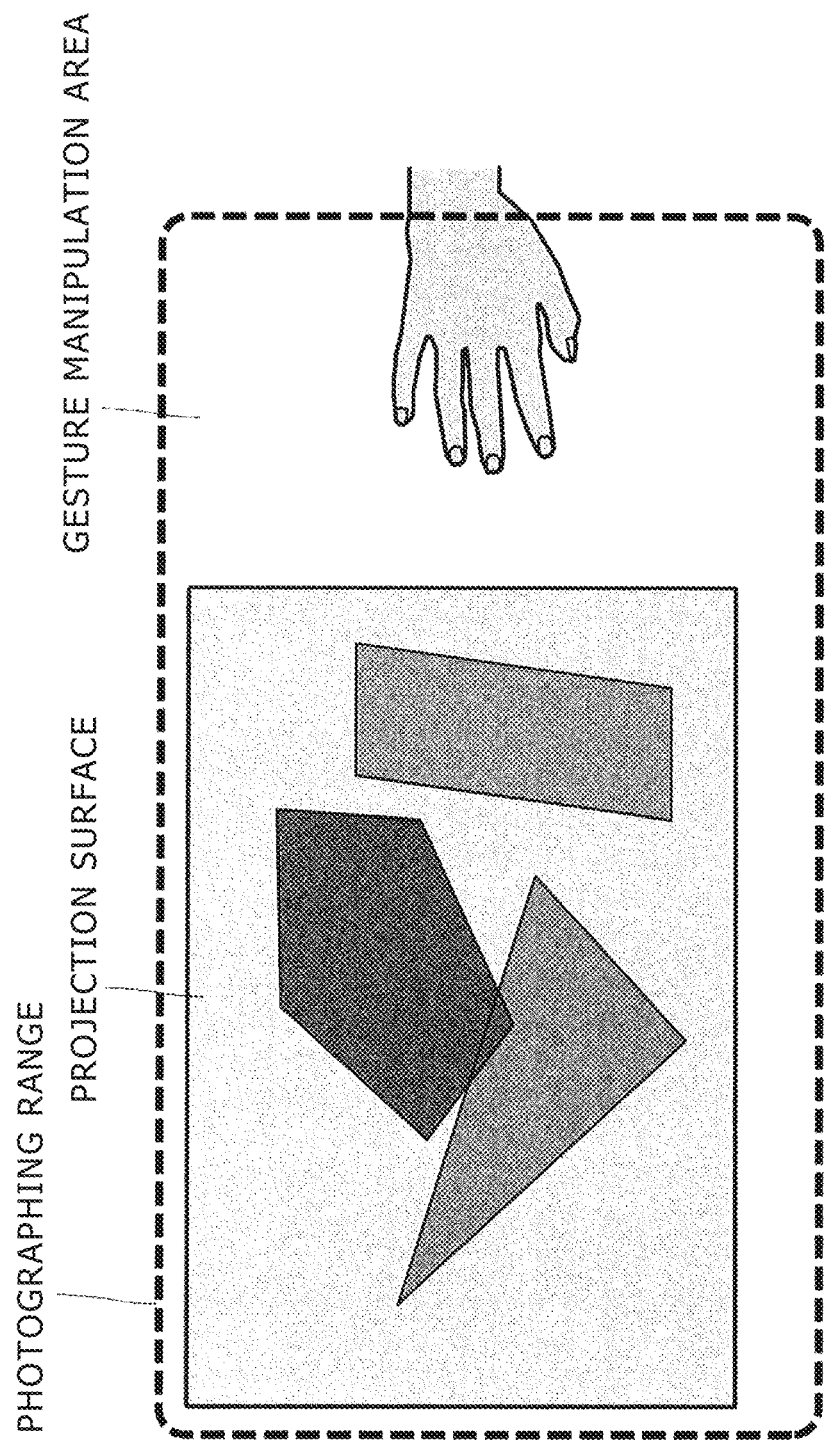

USER 2 MAKES SERVE

ACTIVATION OF PUCK CORRESPONDING TO GESTURE MANIPULATION OF USER 2 IS DRAWN

USER 1 MAKES RECEPTION

PROJECTION TYPE IMAGE DISPLAY APPARATUS, IMAGE PROJECTING METHOD, AND COMPUTER PROGRAM

BACKGROUND

The present disclosure relates to a projection type image display apparatus with which a picture of a computer or the like is displayed on a screen through projection, an image projecting method used in the same, and a computer program used in the same. More particularly, the present disclosure relates to a projection type image display apparatus either which is loaded with a camera, or which is used in combination with a camera, an image projecting method used in the same, and a computer program used in the same.

Various kinds of products, such as home electric appliances and information apparatuses, which are controlled-objects for a user are present in the environment in which the human beings live. One of methods of remote-controlling this sort of apparatus by the user includes a gesture manipulation.

For example, Japanese Patent Laid-Open No. 2010-79332 (as Patent Document 1) proposes a teleoperation apparatus. In this case, with teleoperation apparatus, an image of a manipulator who manipulates either a manipulation button or a manipulation display section for displaying thereon a menu is captured, and a manipulation carried out by the manipulator is detected based on a shape and a motion of a hand detected from the captured image, and the display of the manipulation display section. According to this related art, it is possible to recognize a gesture of the user by using an outline of a finger(s) or a hand(s).

In addition, for example, Japanese Patent Laid-Open No. 2010-15553 (as Patent Document 2) proposes an image recognizing apparatus. In this case, with the image recognizing apparatus, an operation for a virtual manipulation surface made by a manipulator is three-dimensionally read, and it is determined whether or not the operation is a manipulation based on a positional relationship between a part of the manipulator, and the virtual manipulation surface. Then, when the operation of the manipulator is carried out within an area of any of two or more virtual manipulation hierarchies which are decided based on the positional relationship between the part of the manipulator, and the virtual manipulation surface, the contents of the manipulation is determined based on kinds of manipulations previously allocated to the virtual manipulation hierarchies, respectively, and the operation of the manipulator within the virtual manipulation hierarchy.

The gesture manipulation is based on that the user is photographed, and an image of the user is recognized, thereby understanding the gesture. Therefore, it is expected that the gesture manipulation can be adopted in the various kinds of home electric appliances or information apparatuses each loaded with the camera.

On the other hand, projection type image display apparatuses each loaded with a camera has also been developed. However, most of the projection type image display apparatuses aims at correcting a trapezoidal distortion which is generated in a projected image, for example, when the image captured with the camera is projected obliquely on an image projected body (such as a screen wall surface). That is to say, in general, with this sort of projection type image display apparatus, a test pattern is projected on the screen, an image of the test pattern is captured by the built-in camera, and thus the trapezoidal distortion is corrected based on positions of the four corners of the resulting screen, and positions of four corners of the test pattern. This sort of projection type image display apparatus, for example, is described in Japanese Patent Laid-Open No. 2007-13810 (as Patent Document 3).

As described above, although the projection type image display apparatuses each loaded with the camera are present, the camera concerned is used to regulate the distortion in the phase of the projection, and thus such a camera as to be used in the gesture manipulation has not been yet produced on a commercial basis.

SUMMARY

The present disclosure has been made in order to solve the problems described above, and it is therefore desirable to provide an excellent projection type image display apparatus which is either loaded with a camera or is used in combination with a camera, and thus which can recognize an image of a user photographed with a camera, thereby carrying out a gesture manipulation, an image projecting method used in the same, and a computer program used in the same.

In order to attain the desire described above, firstly, according to an embodiment of the present disclosure, there is provided a projection type image display apparatus including: a projecting portion projecting an input image on an image projected body; a camera portion photographing the image projected body; a display control block controlling display of a projected image projected by the projecting portion; and a gesture recognizing unit recognizing a gesture manipulation of a user contained in the image photographed by the camera portion.

Secondly, in the projection type image display apparatus according to the embodiment of the present disclosure, preferably, the camera portion may photograph a projection surface of the projecting portion every predetermined time interval; and the gesture recognizing unit may recognize the gesture manipulation carried out on the projection surface based on a differential image obtained through an inter-frame difference between the photographed images for each of the predetermined time intervals.

Thirdly, in the projection type image display apparatus according to the embodiment of the present disclosure, preferably, the display control block may provide a gesture manipulation area within a photographing area of the camera portion.

Fourthly, in the projection type image display apparatus according to the embodiment of the present disclosure, preferably, the display control block may form the gesture manipulation area for which gain correction is carried out or which is made approximately a write image within the photographed image; and the gesture recognizing unit may search for a hand shape and recognize the gesture within the gesture manipulation area.

Fifthly, in the projection type image display apparatus according to the embodiment of the present disclosure, preferably, the display control block may provide the gesture manipulation area in response to that the gesture recognizing unit detects a change within the frames of the photographed image.

Sixthly, in the projection type image display apparatus according to the embodiment of the present disclosure, preferably, the display control block may cause the gesture manipulation area to disappear either when the gesture manipulation area is provided, and the hand shape is not detected within a predetermined period of time or when the gesture is not detected.

Seventhly, in the projection type image display apparatus according to the embodiment of the present disclosure, preferably, the display control block may cause visual information representing that the gesture recognizing unit recognizes the hand shape to be displayed within the projected image.

Eighthly, in the projection type image display apparatus according to the embodiment of the present disclosure, preferably, the display control block may cause visual information representing that the gesture recognizing unit ends processing for recognizing the gesture manipulation to be displayed within the projected image.

Ninthly, in the projection type image display apparatus according to the embodiment of the present disclosure, preferably, the display control block may carry out guide display representing a gesture manipulating method within the gesture manipulation area.

Tenthly, in the projection type image display apparatus according to the embodiment of the present disclosure, preferably, the display control block may usually provide the gesture manipulation area within the photographing area of the camera portion when a moving image is projected by the projecting portion.

Eleventhly, in the projection type image display apparatus according to the embodiment of the present disclosure, preferably, the display control block may display the gesture manipulation area composed of a still image so as to superimpose the gesture manipulation area on the moving image.

Twelfthly, in the projection type image display apparatus according to the embodiment of the present disclosure, preferably, when the display of the gesture manipulation area is carried out, the display control block may degenerate a projection size of the input image so as to prevent the input image from overlapping the gesture manipulation area.

Thirteenthly, in the projection type image display apparatus according to the embodiment of the present disclosure, preferably, the display control block may carry out the display of the gesture manipulation area by utilizing an extra area, after the input image is projected from the projecting portion, of an area which is adapted to be projected on the image projected body by the projecting portion.

Fourteenthly, preferably, the projection type image display apparatus according to the embodiment of the present disclosure may further include an image correction amount calculating unit calculating an image correction amount with which a distortion when the input image is projected on the image projected body from the projecting portion based on the image photographed by the camera body, in which the display control block may correct the input image based on the image correction amount; and the gesture recognizing unit may use a portion on which the input image after the correction is not projected as the gesture manipulation area.

Fifteenthly, according to another embodiment of the present disclosure, there is provided a projection type image displaying method including: projecting an input image on an image projected body; photographing the image projected body; and recognizing a gesture manipulation of a user contained in a photographed image obtained in the photographing.

Sixteenthly, according to still another embodiment of the present disclosure, there is provided a computer program described in a computer-readable form so as to cause a computer to function as: a projecting portion projecting an input image on an image projected body; a camera portion photographing the image projected body; a display control block controlling display of a projected image projected by the projecting portion; and a gesture recognizing unit recognizing a gesture manipulation of a user contained in the image photographed by the camera portion.

The computer program according to still another embodiment described above of the present disclosure defines as a computer program which is described in the computer-readable form so as to realize the predetermined pieces of processing on the computer. In other words, the computer program according to still another embodiment described above of the present disclosure is installed in the computer, whereby a cooperative operation can be brought out on the computer, and thus it is possible to obtain the same operation and effects as those in the projection type image display apparatus according to the embodiment of the present disclosure.

As set forth hereinabove, according to the present disclosure, it is possible to provide the excellent projection type image display apparatus which is either loaded with the camera or used in combination with the camera, and thus which can recognize the image of the user photographed with the camera, thereby carrying out the gesture manipulation, the image projecting method used in the same, and the computer program used in the same.

In addition, according to the present disclosure, the recognition precision of the hand shape can be enhanced based on the inter-frame difference on the projection surface as well on which the image is projected, and thus the gesture manipulation becomes possible. Also, the enhancement of the recognition precision of the hand shape also leads to the improvement in the manipulation property of the gesture.

In addition, according to the present disclosure, the gesture manipulation recognized makes it possible to carry out the cooperative manipulation with any other suitable apparatus.

Also, according to the present disclosure, since the hand shape recognition rate is ensured, the hands of plural users can be recognized separately from one another. As a result, the gesture manipulation made by the plural users can be carried out on the projection surface becoming the large screen.

The above and other objects, features, and advantages will become apparent from the more detailed description, taken in conjunction with embodiments which will be described later, and the accompanying drawings in which like portions or elements are designated by like reference numerals or symbols, respectively.

BRIEF DESCRIPTION OF THE DRAWINGS

FIG. 1 is a block diagram schematically showing a configuration of a projection type image display apparatus according to a first embodiment of the present disclosure;

FIG. 3 is a flow chart explaining a schematic processing procedure for recognizing a hand shape on the projection type image display apparatus according to the first embodiment of the present disclosure;

FIG. 5 is a view showing a situation in which a gesture manipulation area other than the projection surface is provided by enlarging a photographing area provided by a camera portion;

DETAILED DESCRIPTION OF THE PREFERRED EMBODIMENTS

Figure 2A:
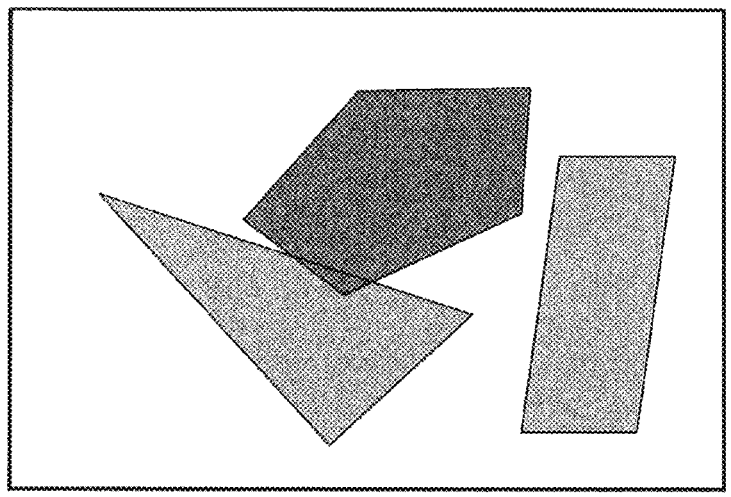
FIGS. 2A to 2C are respectively views explaining a method of carrying out gesture recognition based on detection of a difference between frames with respect to an image obtained by photographing a projection surface.

Hereinafter, embodiments of the present disclosure will be described in detail with reference to the accompanying drawings.

FIG. 1 is a block diagram schematically showing a configuration of a projection type image display apparatus according to a first embodiment of the present disclosure. The projection type image display apparatus 100 shown in the figure includes a projecting portion 101, a control portion 102, an input/output interface 103, a camera portion 104, and an image processing portion 105. Hereinafter, these portions mentioned above will be described in detail with reference to FIG. 1.

An external apparatus such as a personal computer or a TV set (both not shown) is connected to the input/output interface 103. Thus, the input/output interface 103 carries out input of data on an image which is desired to be projected. It is supposed that the input image includes a still image and a moving image. In addition, the projection type image display apparatus 100 can also be connected to a home network (not shown) through the input/output interface 103 and thus can make a communication with any of various kinds of apparatuses installed on the home network.

The camera portion 104 is installed so as to photograph an image which is projected on an image projected body (not shown) by the projecting portion 101. The image processing portion 105 executes predetermined pieces of signal processing such as digital gain control, an Automatic White Balance (AWB) control, and sharpness/saturation contrast regulation for a signal corresponding to an image photographed by the camera portion 104.

The control portion 102 includes a display control block 110, an image recognizing block 120, and an apparatus operation control block 130. In addition, the image recognizing block 120 includes an image correction amount calculating unit 121, and a gesture recognizing unit 122.

The display control block 110 carries out control for the display of the image which is outputted through the projection from the projecting portion 101. The projecting portion 101 projects the image which is outputted from the control portion 102 on the image projected body such as a screen (not shown). The projected image includes a still image, a moving image, and the like each of which is supplied from the outside through the input/output interface 103. With the display control block 110, predetermined pieces of processing such as image quality correction are suitably executed.

The image is projected in an oblique direction on the image projected body (such as the screen wall surface) from the projecting portion 101, whereby a distortion is generated in the projected image. In order to cope with such a situation, the image correction amount calculating unit 121 detects the distortion which is being generated in the projected image based on results of the image recognition of the image photographed by the camera portion 104, thereby calculating a correction amount based on which the projected image is to be corrected. For example, the image correction amount calculating unit 121 calculates an amount of trapezoidal distortion contained in the projected image from the projecting portion 101, and instructs the display control block 110 to correct the trapezoidal distortion through projection transform of the projected image. However, since the correction processing for the projected image is not directly associated with the subject matter of the technique disclosed in this specification, a detailed description thereof is omitted in this specification.

The gesture recognizing unit 122 detects a hand shape or the like of a user to recognize the gesture manipulation carried out by the user through recognizing processing for the image photographed by the camera portion 104. Here, the gesture recognizing unit 122 instructs the display control block 110 to form a gesture manipulation area which will be described later and which is used to input the gesture to the inside of the projected image, guide display will be described later and which is used to show the user a method for the gesture manipulation, and the like in some cases.

When a command is previously allocated to the gesture manipulation recognized, the gesture recognizing unit 122 identifies the command corresponding to the gesture manipulation recognized. If the command thus identified is a manipulation command corresponding to the projection type image display apparatus 100 concerned, then the gesture recognizing unit 122 transmits the command to the apparatus operation control block 130 and thus controls the apparatus operation.

In addition, if the command thus identified is a manipulation command for the external apparatus which is connected to the projection type image display apparatus 100 through the input/output interface 103, then the gesture recognizing unit 122 transfers the manipulation command to the external apparatus concerned through the input/output interface 103. As a result, a cooperative manipulation between the projection type image display apparatus 100 concerned and another apparatus (external apparatus) becomes possible. For example, when the projection type image display apparatus 100 concerned is connected to the home network through the input/output interface 103, the projecting portion 101 may project and display a user interface picture (not shown) for the manipulation for the external apparatuses on the home network.

Heretofore, the projection type image display apparatuses each loaded with the camera have been present. However, the use application of the photographing is to regulate the distortion in the phase of the projection, and thus any of the projection type image display apparatuses each loaded with the camera which are used in the gesture manipulation has not been yet produced on a commercial basis. On the other hand, the projection type image display apparatus according to the first embodiment of the present disclosure is novel in that the gesture manipulation is carried out through the recognition of the image photographed by the camera portion 104.

Here, when the user carries out the gesture manipulation on the image projected from the projecting portion 101 by using his/her hand(s), the projected image is partially projected on the hand(s). As a result, it is feared that as compared with the case of the normal environment in which the illumination is carried out by using a monochromatic light such as a natural light or an illumination light, the hand shape recognition rate is reduced and thus it may be impossible to recognize the gesture. In addition, if the hand shape recognition rate is low, then not only it may be impossible to recognize the gesture, but also the mal-recognition is carried out in some cases. In this case, the manipulation property of the gesture becomes poor.

Making an additional remark, the projection surface from the projecting portion 101 becomes the larger screen than that in the case of the general display device, and thus plural persons become easy to share the projection surface with one another. However, there is also not found out the related art with which plural persons carry out the gesture manipulations, respectively, at the same time.

Then, in the projection type image display apparatus 100 of the first embodiment, a difference between the frames is detected with respect to the images obtained by photographing the projection surface, thereby carrying out the gesture recognition. That is to say, when the still image projected from the projecting portion 101 is photographed as the moving image by the camera portion 104, the gesture recognizing unit 122 carries out the detection of the difference between the frames, thereby detecting that the hand has entered the projection surface.

Figure 2B:
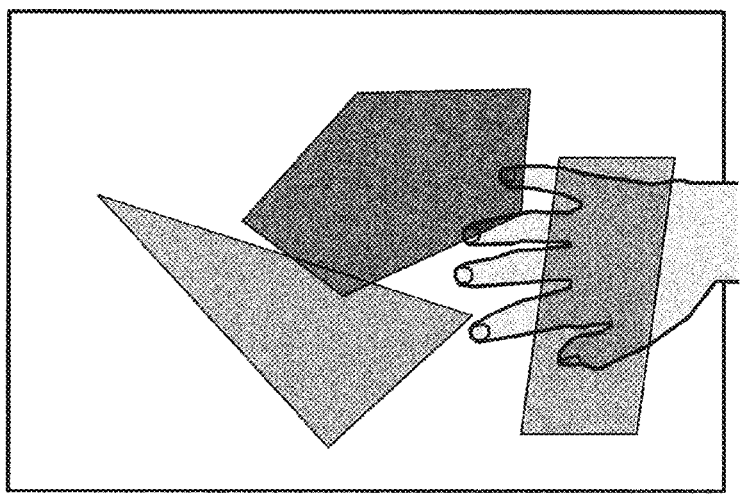
Figure 2C:
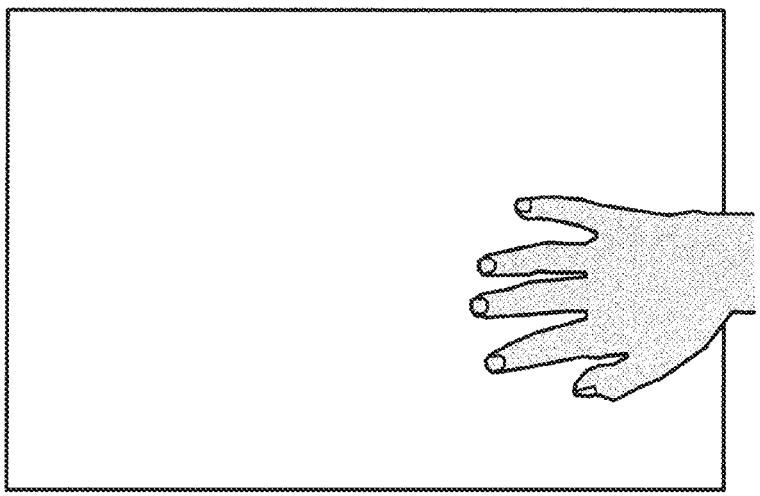

FIG. 2A shows an image which is obtained by photographing the projection surface before the hand enters the projection surface. FIG. 2B shows an image which is obtained by photographing the projection surface after the hand has entered the projection surface. Also, FIG. 2C shows a result which is obtained by detecting an inter-frame difference between the images shown in FIGS. 2A and 2B, respectively. As can be seen from FIGS. 2A to 2C, the same projected image is projected on the projection surface before the hand enters the projection surface, and on the projection surface after the hand has entered the projection surface (but, these projected images are obtained in the case where the projected image is the still image). Therefore, the difference between these photographed images is detected between the frames, thereby removing the influence of the projected image. Therefore, it is possible to extract the hand shape which is present only in one of the photographed images. As a result, it is expected that the hand shape recognition rate is enhanced.

Referring to FIG. 3, a schematic processing procedure for recognizing the hand shape on the projection surface by the projection type image display apparatus 100 is shown in the form of a flow chart. In the camera portion 104, in processing in step S301, the still image projected on the image projected body from the projecting portion 101 either is photographed as the moving image, or is photographed as the still image every predetermined time interval. Also, in processing in step S302, the gesture recognizing unit 122 detects the difference either between two frames which have been extracted from the photographed moving images every predetermined time interval, or between two frames of the still images which have been photographed at predetermined time interval. Also, in processing in step S302, when the hand shape which has appeared on the projection surface of the projecting portion 101 based on the differential image, in processing in step S304, the hand shape detected is tracked, thereby recognizing the gesture manipulation.

As described above, by executing the inter-frame difference processing, it is possible to remove the influence of the projected image which is partially projected on the hand which has entered the projection surface. However, for the sake of further enhancing the precision of recognition of the hand, a gesture manipulation area with which the hand is caused to be easy to recognize may be provided within the projection surface. Alternatively, by executing the zoom processing of the camera portion 104 or the like, the photographing area may be made larger than the normal projection surface, and under this condition, the gesture manipulation area other than the projection surface may also be provided. In any case, for the gesture recognition, the gesture manipulation area needs to be disposed within the photographing area of the camera portion 104.

When the gesture manipulation area is provided within the photographing area, the display control block 110 either carries out the gain correction or displays the white image with respect to a portion corresponding to the gesture manipulation area within the projected image, whereby the reduction in the recognition precision due to the projected image is partially projected on the hand is suppressed.

Figure 4A:
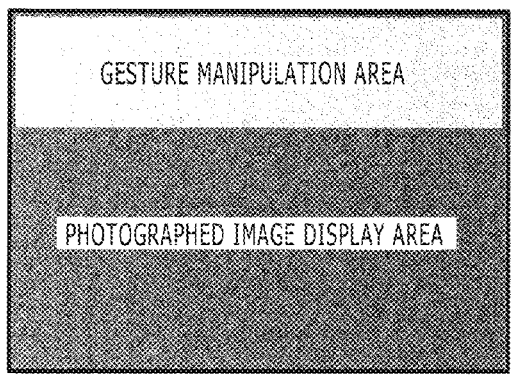
FIGS. 4A to 4F are respectively views showing situations in each of which a gesture manipulation area is provided (placed) within the projection surface.
Figure 4D:
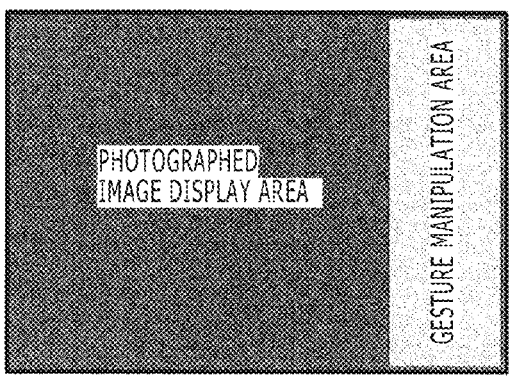
Figure 4B:
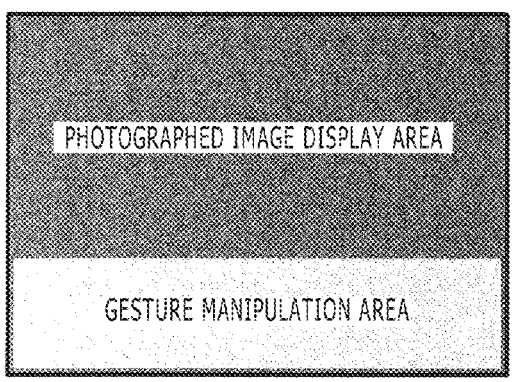
Figure 4E:
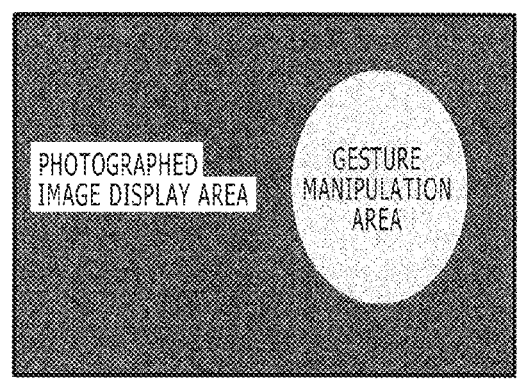
Figure 4C:
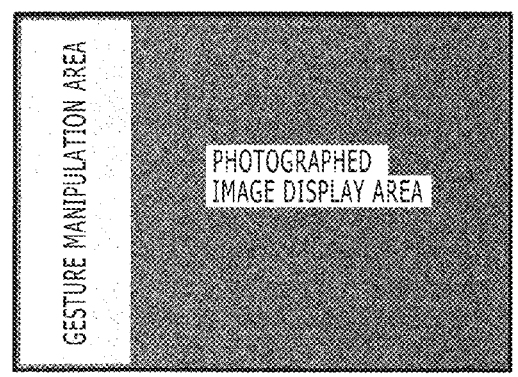
Figure 4F:
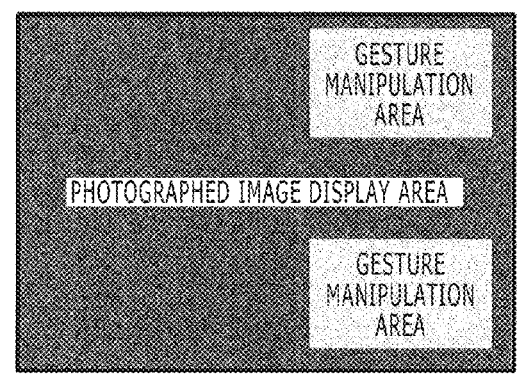

FIGS. 4A to 4F respectively show situations in each of which the gesture manipulation area is provided (placed) within the photographing area. In addition, FIG. 5 shows a situation in which the photographing range by the camera portion 104 is enlarged by carrying out the zooming manipulation or the like to provide the gesture manipulation area other than the projection surface. In the former case where either the gain correction is carried out for the projected image by the display control block 110 or the approximately white image is formed by the display control block 110, thereby providing the gesture manipulation area, a place, a size, and a shape with which the gesture manipulation area is disposed within the projection surface are arbitrarily set. For example, as shown in FIGS. 4A to 4F, the gesture manipulation areas can be disposed on upper and lower sides, and left- and right-hand sides of the projection surface, respectively. As shown in FIG. 4E, the gesture manipulation area having an arbitrary shape, including a circular shape can be provided in an arbitrary place within the projection image. As shown in FIG. 4F, the gesture manipulation areas can be decentrally provided in two, or three or more positions such as upper and lower both ends on the right-hand side of the projection surface.

However, when the gesture manipulation area is provided by the switching of the display of the projected image by the display control block 110, an area is degenerated on which the original image (the input image inputted through the input/output interface 103) is displayed through the projection. Therefore, the gesture manipulation area is provided on a steady basis, which results in that an amount of information displayed is unnecessarily reduced. In addition, when the gesture manipulation area other than the projection surface is provided through the enlargement of the photographing area of the camera portion 104, the resolution of the image photographed by the camera portion 104 is reduced. Therefore, when the gesture manipulation area is provided on a steady basis, it is feared that the precision of the calculation for the amount of correction for the trapezoidal distortion or the like is reduced.

Then, it may be adopted that normally, no gesture manipulation area is provided, the gesture manipulation area is installed in response to the fact that the presence of the hand is detected within the projection surface of the projecting portion 101, and no gesture manipulation area is provided for a period of time for which the presence of the head is not detected. As shown in FIGS. 2A to 2C, the inter-frame difference is obtained, whereby it is possible to detect that the hand of the user has appeared within the projected image. Also, by detecting the change within the frames due to appearance and disappearance of the hand of the user, it is possible to determine that the gesture manipulation is started from now on.

In addition, in the case of many information apparatuses, such an information apparatus includes a section for feeding the fact that the input is fetched in the apparatus with safety back to the user based on the manipulation feeding of the button, the image, the sound or the tactile sensation with respect to the user input. On the other hand, the gesture manipulation carried out on the projection surface (or within the image photographed by the camera portion 104) as shown in FIG. 3 is a manipulation for the image projected body (such as the screen) which is provided outside the projection type image display apparatus 100 (or a manipulation carried out in the vicinity of the surface of the image projected body). As a result, it may be impossible to carry out the feedback of the fact that the hand shape has been recognized or the gesture has been recognized to the user in the image projected body.

Figure 6:
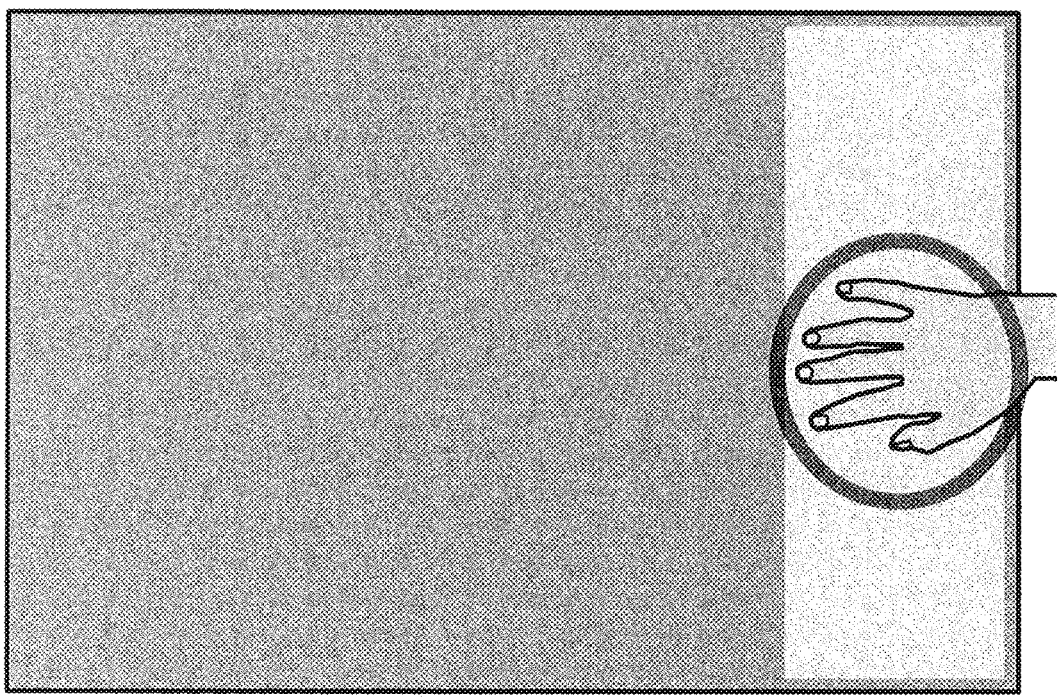
FIG. 6 is a view showing an example of a projected image with which it is visually fed back that a hand shape has been successful in recognition.
Figure 7:
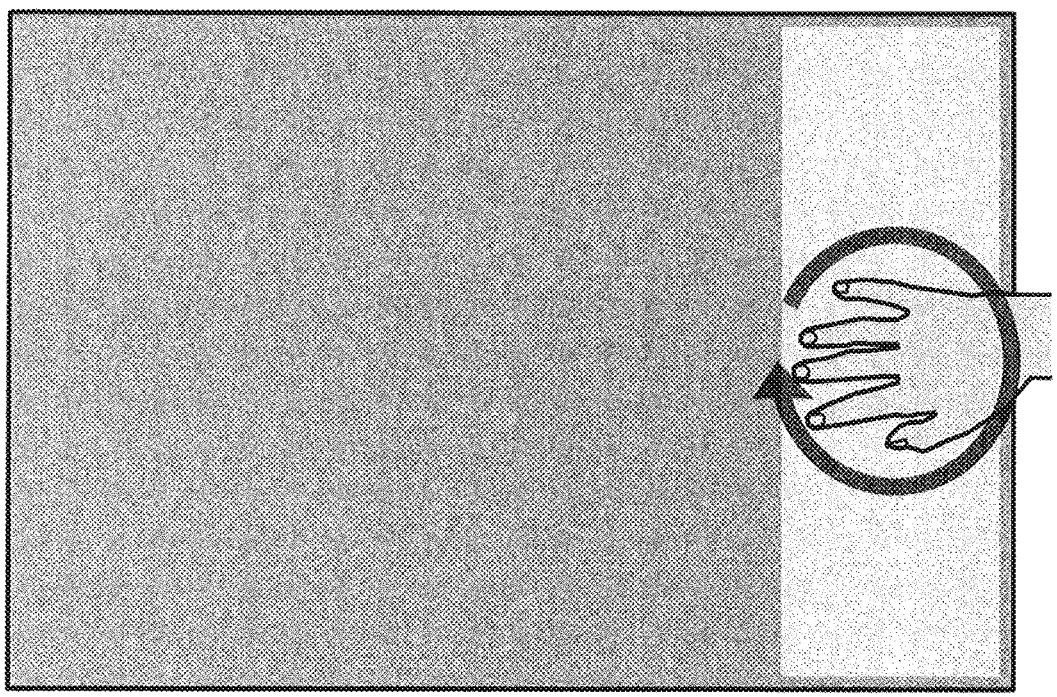
FIG. 7 is a view showing an example of a projected image with which it is visually fed back that processing for recognizing a gesture manipulation has been completed.

Then, the control may be carried out in such a way that either when the hand shape has been recognized in the gesture recognizing block 120 or when the processing for recognizing the gesture has been completed, the visual information such that the display control block 110 gives the feedback to the user is provided within the projected image. When the hand shape has been recognized by the gesture recognizing block 120, for example, as shown in FIG. 6, a circle which covers the hand thus recognized is displayed so as to be superimposed on the original projected image. In addition, when the processing for recognizing the gesture has been completed, for example, as shown in FIG. 7, such an arrow as to go around the recognized hand is displayed, and so forth, whereby such an image as to suggest that the processing has successfully ended is displayed so as to be superimposed on the original projected image.

In addition, the gesture input is still far from general, and thus the method for the gesture is not yet made well known. Although as shown in FIG. 6, it has been made successful to cause the user to recognize the shape of his/her hand on the projection surface, the user cannot find out that when what kind of motion of the hand he/she makes next time, the gesture input can be carried out in some cases. In order to cope with such a situation, the control may be carried out in such a way that such virtual information (guide display) that the display control block 110 shows the user the next gesture manipulation is provided either within the projected image or in the gesture manipulation area which is provided within the projected image.

Figure 8:
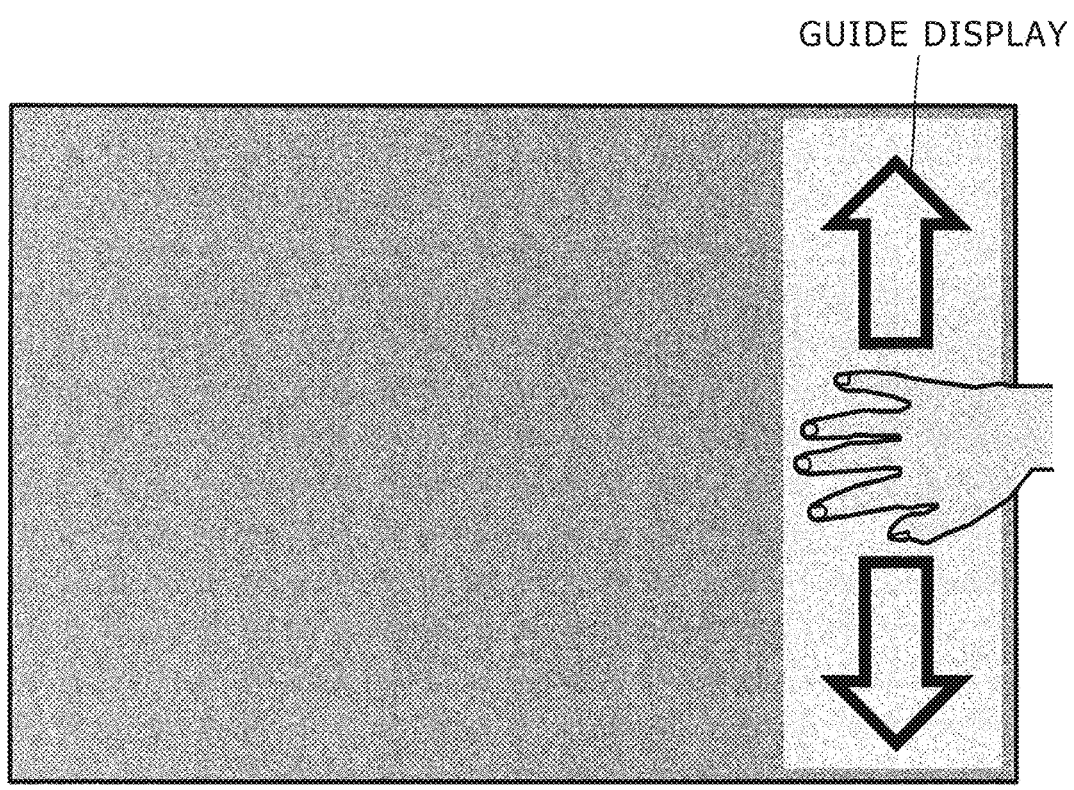
FIG. 8 is a view showing an example in which guide display is carried out within a gesture manipulation area.
Figure 9:
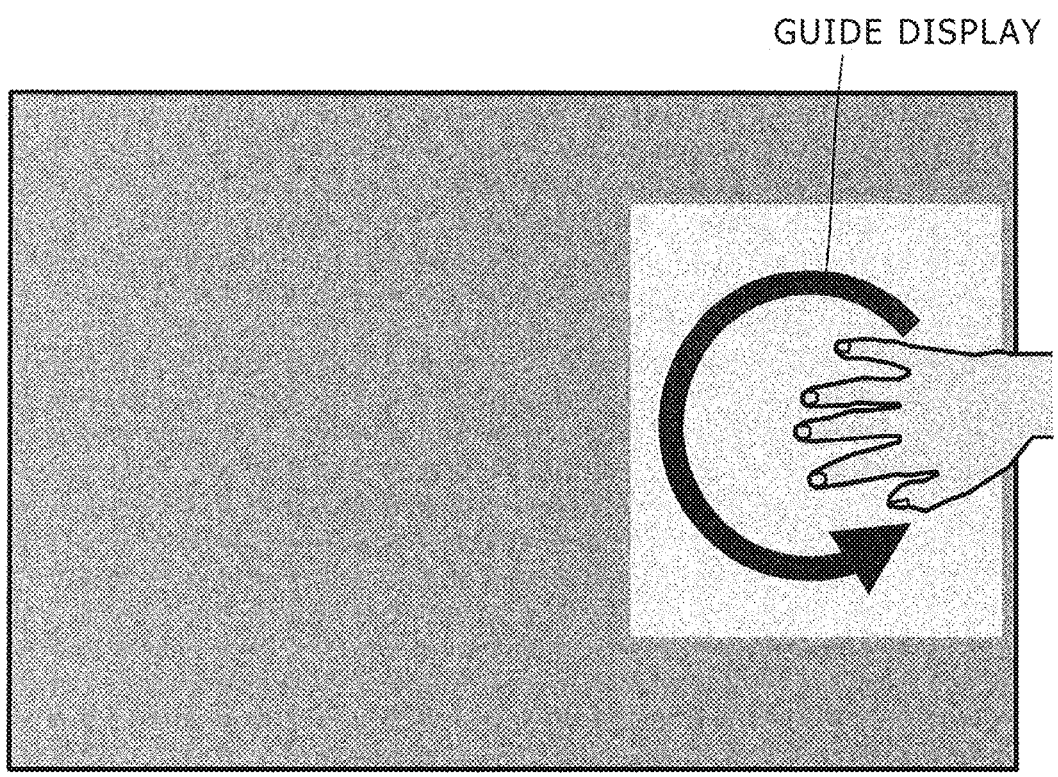
FIG. 9 is a view showing another example in which the guide display is carried out within the gesture manipulation area.

FIGS. 8 and 9 shows examples of the guide display, respectively. In the example shown in FIG. 8, the guide display is composed of an image of arrows which are directed upward and downward, respectively, with respect to the recognized hand. Thus, the guide display guides that if the user moves his/her hand either upward or downward within the projection surface, then the user can carry out the gesture manipulation. In addition, in the example shown in FIG. 9, the guide display is composed of an image of a circular arc-like arrow which goes around the hand recognized in a counterclockwise direction with the hand recognized as a starting point. Thus, the guide display guides that if the user moves his/her hand in the counterclockwise direction within the projection surface, then the user can carry out the gesture manipulation. The guide display is carried out on a constant basis results in being visually troublesome. For this reason, either only for a period of time until the processing for recognizing the gesture manipulation has ended after the hand shape was recognized, or only for a period of time for which the gesture manipulation is expected to be carried out, the guide display may be carried out.

Figure 10:
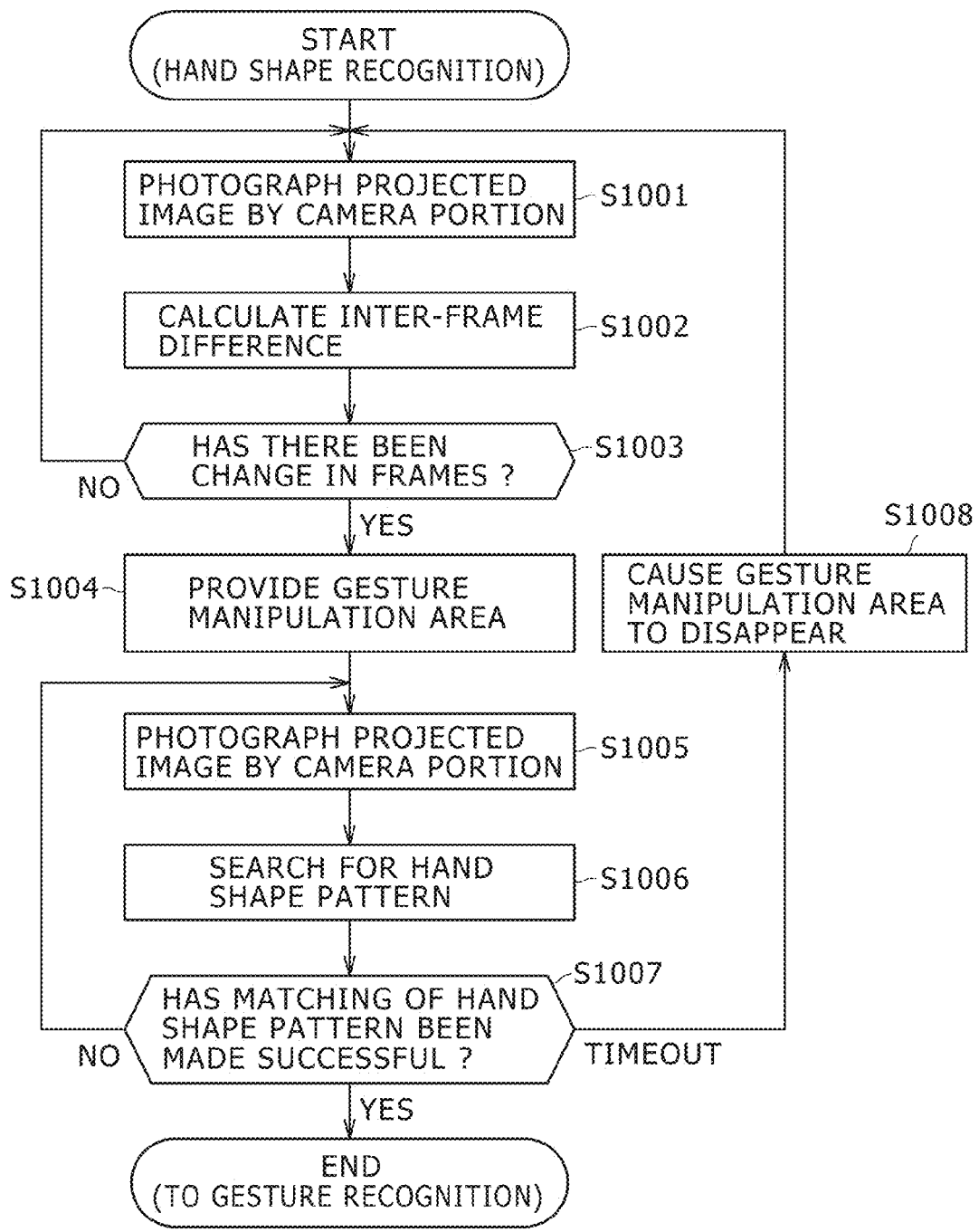
FIG. 10 is a flow chart explaining a processing procedure (until a hand shape is detected) for detecting a hand shape on the projection surface by the projection type image display apparatus according to the first embodiment of the present disclosure, and recognizing the gesture manipulation through the guide display.
Figure 11:
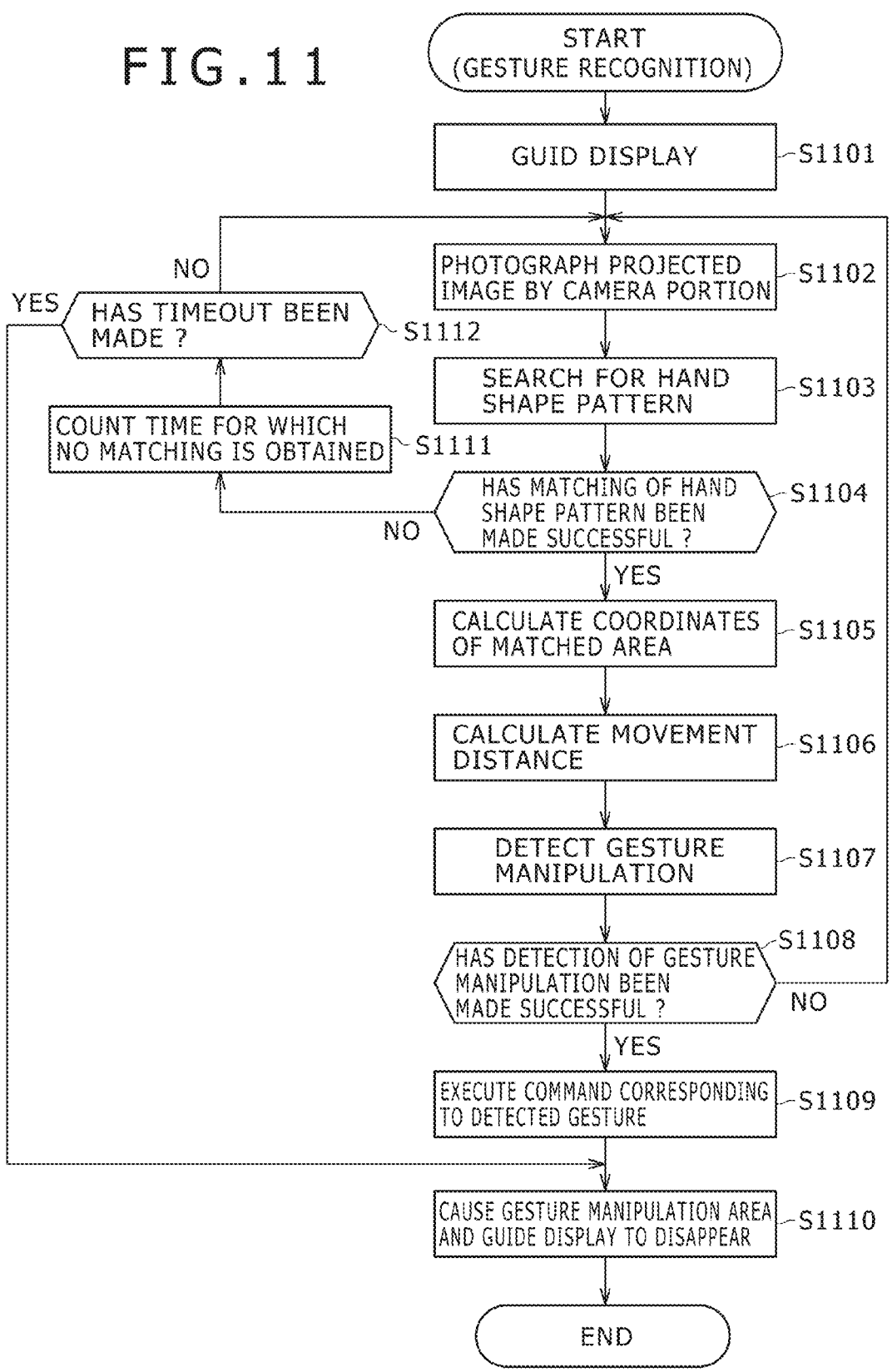
FIG. 11 is a flow chart explaining a processing procedure (until the gesture manipulation based on the hand shape detected is recognized) for detecting a hand shape on the projection surface by the projection type image display apparatus according to the first embodiment of the present disclosure, and recognizing the gesture manipulation through the guide display.

FIGS. 10 and 11 show a processing procedure for detecting the hand shape on the projection surface by the projection type image display apparatus 100, and recognizing the gesture manipulation through the guide display by the projection type image display apparatus 100 in the form of flow charts.

In processing in step S1001, the camera portion 104 either photographs the still image which is projected on the image projected body from the projecting portion 101 as the moving image or photographs the still image which is projected on the image projected body from the projecting portion 101 as the still image every predetermined time interval.

Also, in processing in step S1002, the gesture recognizing unit 122 calculates a difference either between two frames extracted from the photographed moving image every predetermined time interval or between two frames of the still images photographed every predetermined time interval. In addition, in processing in step S1003, the gesture recognizing unit 122 detects whether or not there is a change in the frames.

In the case where the projected image is the still image, the same image to be projected is projected on both of the projection surface before the hand enters the projection surface, and the projection surface after the hand has entered. Therefore, the gesture recognizing unit 122 obtains the inter-frame difference in the processing in step S1002 to remove the influence of the projected image, thereby making it possible to discriminate whether or not the hand has entered the projection surface.

When the change is detected in the frames based on the differential image (Yes in the processing in step S1003), for the purpose of recognizing the hand shape with high recognition precision, for example, as shown in FIGS. 4A to 4F, in processing in step S1004, the display control block 110 forms the gesture manipulation area within the projected image. On the other hand, when no change is detected within the frames (No in the processing in step S1003), the operation returns back to the processing in step S1001. Then, the photographing of the projection surface is continuously carried out by the camera portion 104, and the projection type image display apparatus 100 waits until a change is generated in the frames.

In and after the display of the gesture manipulation area has been started, in processing in step S1005, the camera portion 104 continuously photographs the projected image from the projecting portion 101. Also, in processing in step S1006, the gesture recognizing unit 122 searches for the hand shape pattern from the gesture manipulation area.

Here, when the gesture recognizing unit 122 has been successful in the matching of the hand shape pattern within the gesture manipulation area (Yes in processing in step S1007), subsequently, the operation proceeds to predetermined pieces of gesture recognizing processing shown in FIG. 11. It is noted that at a time point when the gesture recognizing unit 122 has been successful in the matching of the hand shape pattern within the gesture manipulation area, that is, in the recognition of the hand shape, the visual feedback representing the success in the hand shape recognition as shown in FIG. 6 may be carried out. However, preferably, the visual feedback is ended for a short time so as to get in the way of the subsequent gesture recognition.

On the other hand, when the gesture recognizing unit 122 fails in the matching of the hand shape pattern (No in the processing in step S1007), the operation returns back to the processing in step S1005. Then, the camera portion 104 continuously photographs the projection surface. Also, the gesture recognizing unit 122 continues to search for the hand shape pattern within the gesture manipulation area.

In addition, when a predetermined period of time has elapsed from start of the display of the gesture manipulation area, that is, when timeout has been made, in processing in step S1008, the display of the gesture manipulation area is caused to disappear, and the processing for searching for the hand shape pattern is then stopped. Also, the operation returns back to the processing in step S1001. Then, the photographing of the projection surface is continuously carried out by the camera portion 104, and the projection type image display apparatus 100 waits until a change is generated in the frames.

In processing in step S1101, in the phase of the recognition of the gesture manipulation, the guide display as shown in FIG. 8 or 9 is suitably carried out as may be necessary. In addition, in processing in step S1102, the camera portion 104 continuously photographs the projected image from the projecting portion 101. Also, in processing in step S1103, the gesture recognizing unit 122 searches for the hand shape pattern within the gesture manipulation area.

When the gesture recognizing unit 122 has been successful in the matching of the hand shape pattern within the gesture manipulation area (Yes in processing in step S1104), in processing in step S1105, the gesture recognizing unit 122 calculates the coordinates of the area of the matched hand shape. Also, in processing in step S1106, the gesture recognizing unit 122 calculates a movement distance of the hand shape. In addition, in processing in step S1107, the gesture recognizing unit 122 tries to detect the corresponding gesture manipulation based on the movement distance thus calculated. However, a method of detecting the gesture manipulation based on the movement distance of the hand shape is merely an example, and thus the three pieces of the processing in steps S1105 to S1107 can also be replaced with any other suitable detecting method.

Here, when the gesture recognizing unit 122 has been successful in the detection of the gesture manipulation (Yes in processing in step S1108), in processing in step S1109, the gesture recognizing unit 122 executes processing for a command corresponding to the gesture thus detected. When the command thus detected is a manipulation command for the projection type image display apparatus 100 concerned, the gesture recognizing unit 122 transmits the command to the apparatus operation control block 130, and then the apparatus operation control block 130 controls the apparatus operation. In addition, when the command thus detected is a manipulation command for the external apparatus which is connected to the projection type image display apparatus 100 through the input/output interface 103, the gesture recognizing unit 122 transfers the manipulation command to the corresponding external apparatus through the input/output interface 103. As a result, the cooperative manipulation between the projection type image display apparatus 100 concerned and the corresponding external apparatus becomes possible.

Also, after the command processing has ended, in processing in step S1110, the gesture manipulation area which was displayed in the processing in step S1004, and the guide display which was displayed in the processing in step S1101 are both caused to disappear. As a result, the gesture recognizing processing ends.

On the other hand, when the gesture recognizing unit 122 has failed in the detection of the gesture manipulation (No in the processing in step S1108), the operation returns back to the processing in step S1102. Also, the camera portion 104 continuously photographs the projected image from the projecting portion 101, and the gesture recognizing unit 122 continues to search for the hand shape pattern within the gesture manipulation area.

In addition, when the gesture recognizing unit 122 has failed in the matching of the hand shape pattern within the gesture manipulation area (No in the processing in step S1104), in processing in step S1111, the gesture recognizing unit 122 counts time for which the matching is not obtained. Also, for a period of time until the timeout is made (No in the processing in step S1112), the operation returns back to the processing in step S1102. Also, the camera portion 104 continuously photographs the projected image from the projecting portion 101, and the gesture recognizing unit 122 continues to search for the hand shape pattern within the gesture manipulation area. Also, when the timeout has been made (Yes in the processing in step S1112), in processing in step S1110, the gesture manipulation area which was displayed in the processing in step S1004, and the guide display which was displayed in the processing in step S1101 are both caused to disappear. As a result, the gesture recognizing processing is stopped.

Figure 12:
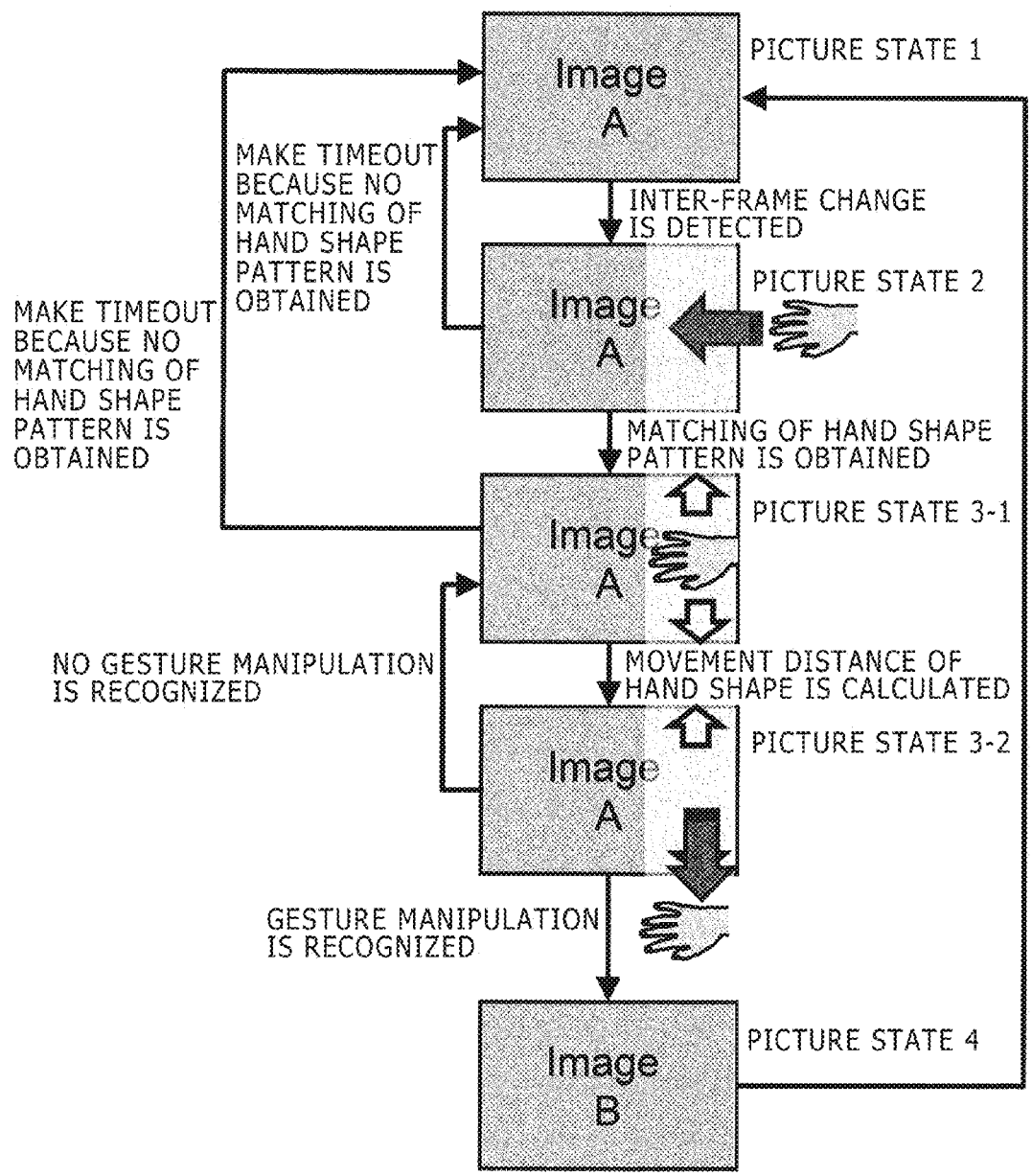
FIG. 12 is a view showing an example of picture transition, of the projected image, which is realized by executing the processing procedures shown in FIGS. 10 and 11, respectively.

FIG. 12 shows an example of transition of the pictures, of the projected images, which is realized by executing the processing procedures shown in FIGS. 10 and 11, respectively, by the projection type image display apparatus 100.

In a picture state 1, an input image (Image A) which has been inputted from the projecting portion 101 through the input/output interface 103 is displayed through the projection as it is. Also, in the camera portion 104, the projected image from the projecting portion 101 is photographed as it is. In the gesture recognizing unit 122, the inter-frame difference between the images photographed by the camera portion 104 is calculated on a steady basis, and it is checked to see if there is a change in the frames.

Here, when the gesture recognizing unit 122 detects that there has been the change in the frames, the picture state transits from the picture state 1 to a picture state 2.

In the picture state 2, the display control block 110 forms the gesture manipulation area within the projected image. Within the gesture manipulation area, either the gain correction is carried out or the approximately white image is obtained, and thus the hand shape becomes easy to recognize as compared with the case of the area on which the original image (the input image "Image A" inputted through the input/output interface 103) is projected. In the case shown in the figure, the gesture manipulation area either for which the gain correction has been carried out or which has been made the approximately white image is superimposed on the original image (Image A). However, the gesture manipulation area may be formed by degenerating the original image.

In the camera portion 104, the projected image from the projecting portion 101 is photographed. Also, the gesture recognizing unit 122 searches for the hand shape pattern within the gesture manipulation area thus photographed. Also, when the gesture recognizing unit 122 has been successful in the matching of the hand shape pattern within the gesture manipulation area, the picture state transits from the picture state 2 to a picture state 3-1.

In addition, when in the picture state 2, the timeout is made because it may be impossible to detect the hand shape pattern within the gesture manipulation area, the display control block 110 causes the gesture manipulation area to disappear from the projected image. Then, the picture state returns back to the picture state 1.

In the picture state 3-1, the display control block 110 carries out the guide display with which the user is shown a method for the gesture manipulation within the gesture manipulation area. In the case shown in the figure, the guide display is composed of arrows directed upward and downward, respectively, for showing the user the fact that if the user moves his/her hand either upward or downward, the user can carry out the gesture manipulation. Also, the guide display is displayed so as to be superimposed on the gesture manipulation area.

The camera portion 104 photographs the projected image from the projecting portion 101. Also, the gesture recognizing unit 122 calculates the coordinates of the area of the matched hand shape, and further calculates the movement distance of the hand shape. Then, as shown in a picture state 3-2, when the hand is moved within the gesture manipulation area, and thus the movement distance of the hand shape is obtained, the gesture recognizing unit 122 tries to recognize the gesture manipulation which has been carried out within the gesture manipulation area.

In addition, when in the picture state 3-1, it might be impossible to detect the hand shape pattern within the gesture manipulation area and thus the timeout was made, the display control block 110 causes the hand shape pattern to disappear from the projected image. Then, the picture state returns back to the picture state 1.

Here, when it may be impossible to detect the gesture manipulation within the gesture manipulation area, the picture state returns back to the picture state 3-1, and the gesture recognizing unit 122 repetitively calculates the movement distance of the matched hand shape pattern.

On the other hand, when in the picture state 3-2, it was possible to recognize the gesture manipulation, there is expected the processing for the command corresponding to the gesture manipulation thus detected. In the picture transition diagram shown in the figure, the command instructed by carrying out the gesture manipulation is to switch the photographed image. Thus, the picture state transits from the picture state 3-2 to a picture state 4, and the display control block 110 causes the projecting portion 101 to project a next image to be projected (an input image "Image B" inputted through the input/output interface 103) on the image projected body. Also, in the state in which the picture is switched, the picture state returns back to the picture state 1.

In the description which has been given until now, there is adopted the method of calculating the movement distance of the recognized hand shape pattern, thereby carrying out the recognition of the gesture manipulation through the recognition of the hand shape. On the other hand, a further simplified method is also expected such that only the change in the gesture manipulation area on the projected image is determined without carrying out the recognition of the hand shape, thereby carrying out the gesture manipulation.

Figure 13:
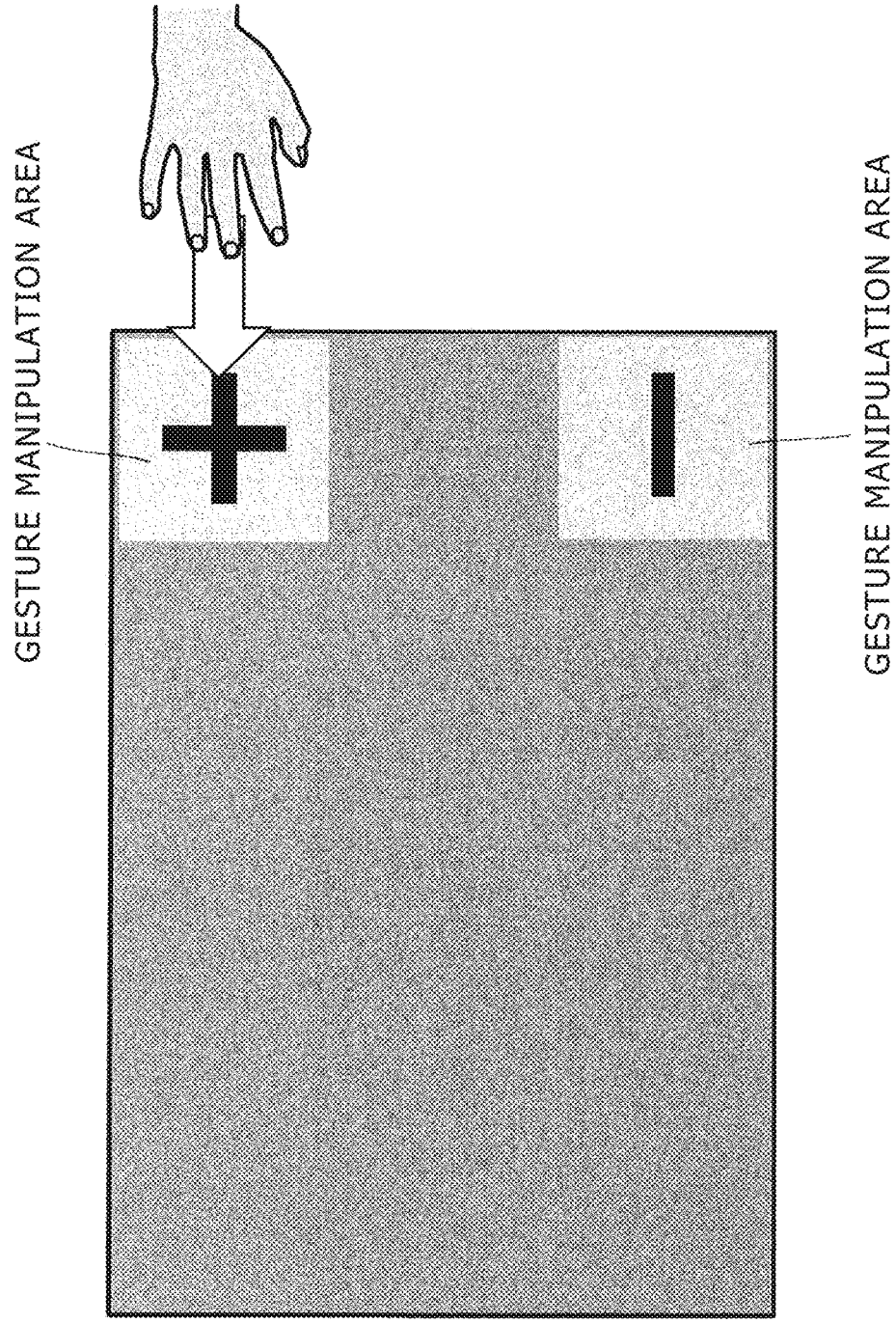
FIG. 13 is a view explaining a simplified gesture manipulation recognizing method.

In the case shown in FIG. 13, the gesture manipulation areas are respectively provided in two portions: an upper end of the right-hand side of the projected image; and a lower end of the right-hand side of the projected image. Also, commands which mean "+" and "−", respectively, are allocated to the two gesture manipulation areas, respectively. Marks of "+" and "−", for example, mean strength and weakness of a quantity of light of the projected image, increase and decrease of a volume of a sound, up and down of a channel (in the case where a television program is projected to be viewed) or the like. As shown in FIG. 13, the user holds his/her hand on the gesture manipulation area of "+". Then, when the difference has been detected within that gesture manipulation area, the gesture recognizing unit 122 recognizes that the gesture manipulation of "+" has been carried out without detecting whether or not the shape is the hand shape. In addition, although not illustrated, this applies to the case as well where the user holds his/her hand on the gesture manipulation area of "−".

In addition, in the description until now, the inter-frame difference is obtained in the manner as shown in the FIGS. 2A to 2C, whereby it is determined that the hand of the user has appeared within the projected image, that is, the gesture manipulation is started from now on, thereby carrying out the display of the gesture manipulation area (for example, refer to FIGS. 4A to 4F). However, although when the projected image is the still image, the appearance and disappearance of the hand of the user can be detected based on the inter-frame difference, when the moving image is being projected, it may become impossible to detect the appearance and disappearance of the hand of the user based on the inter-frame difference because the projected image itself is changed (that is, the contents within the frame are changed by the projected image itself). In order to cope with such a situation, for a period of time for which the moving image is projected on the image projected body, the detection of the hand based on the inter-frame difference may be given up, and the gesture manipulation area may be displayed on a steady basis, thereby making it possible to carry out the gesture manipulation.

Figure 14:
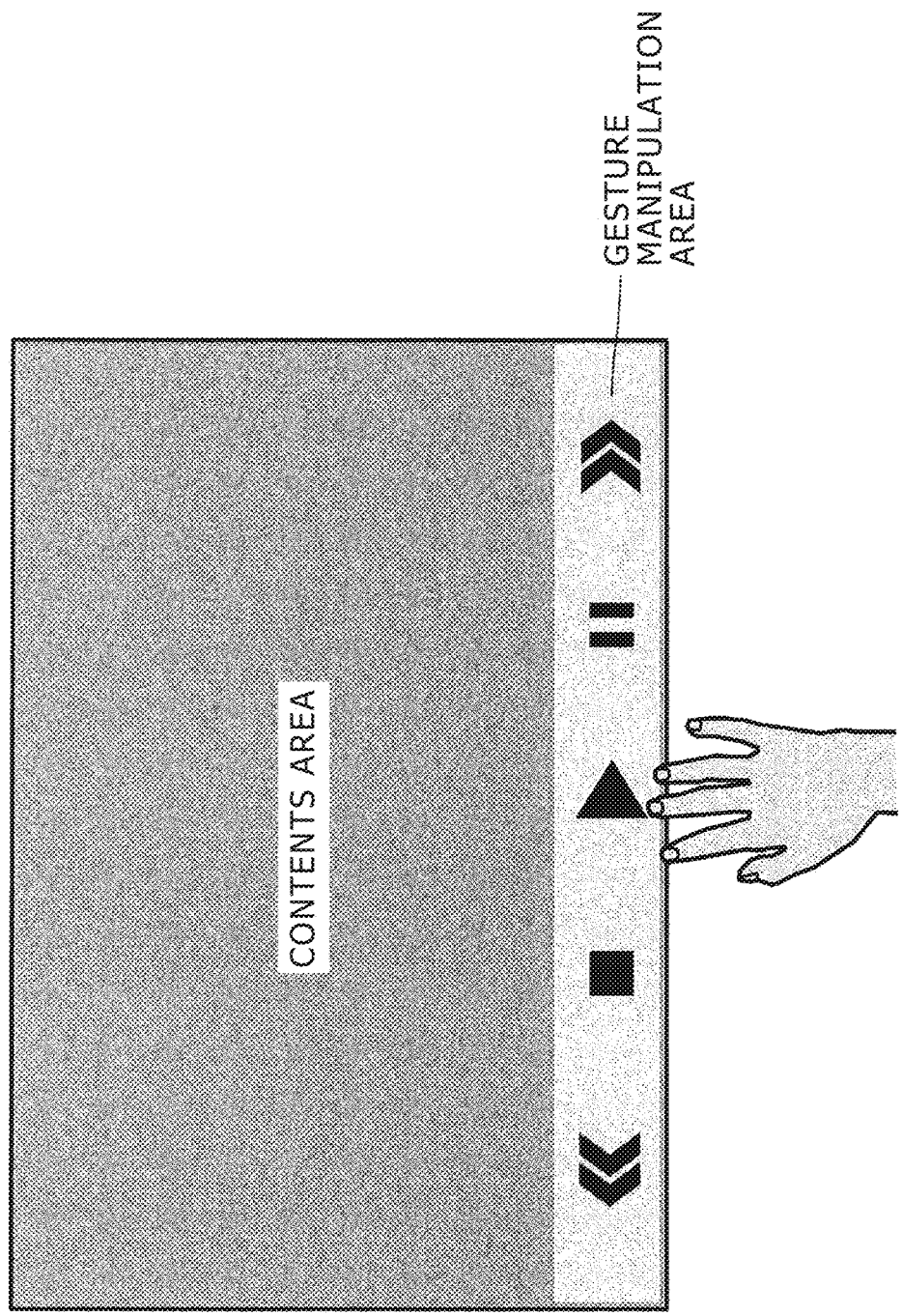
FIG. 14 is a view showing an example of a structure of the projected image in a phase of display of a moving image.

FIG. 14 shows an example of a structure of the projected image in the phase of display of the moving image. In the example shown in the figure, the projected image includes a contents area on which the moving image is projected, and the gesture manipulation area which is displayed on a steady basis.

Since the moving image is displayed on the contents area, when the inter-frame difference is obtained, the motion within the image is also detected. As a result, even when the hand of the user is caused to appear or disappear, it may be impossible to distinguish the hand shape of the user from the moving image. On the other hand, the gesture manipulation area is composed of the still image. Therefore, when the inter-frame difference is obtained, whereby the appearance and disappearance of the hand of the user on the gesture manipulation area is detected and thus it is possible to recognize the gesture manipulation.

In the example shown in FIG. 14, the gesture manipulation area is provided in the lower end edge of the projected image. Buttons of "Return," "Reproduction stop," "Reproduction," "Temporary stop," and "Fast-forward" are displayed in order from the left-hand side. In addition to the buttons shown in the figure, buttons of enlargement and reduction of an image, an operation for feeding to front and back images, area specification, and the like may also be further prepared within the gesture manipulation area. The user holds his/her hand on the button corresponding to the desired manipulation with respect to the moving image displayed on the contents area through the projection, thereby making it possible to carry out the gesture manipulation.

Until now, there has been given the case where the gesture manipulation area either for which the gain correction has been carried out or which has been made the white image is displayed so as to be superimposed on a part of the contents area for the contents such as the still image or the moving image. In the case where the gesture manipulation area is superimposed on the contents area, from a standpoint that the contents are viewed, there is also speculation that the extra image enters the contents area, and thus the image of the contents does not become normal. Then, the display control block 110 may degenerate the contents area so as to correspond to the fact that the gesture manipulation area has been caused to appear, thereby preventing the image of the contents from being interrupted by the gesture manipulation area.

Figure 15:
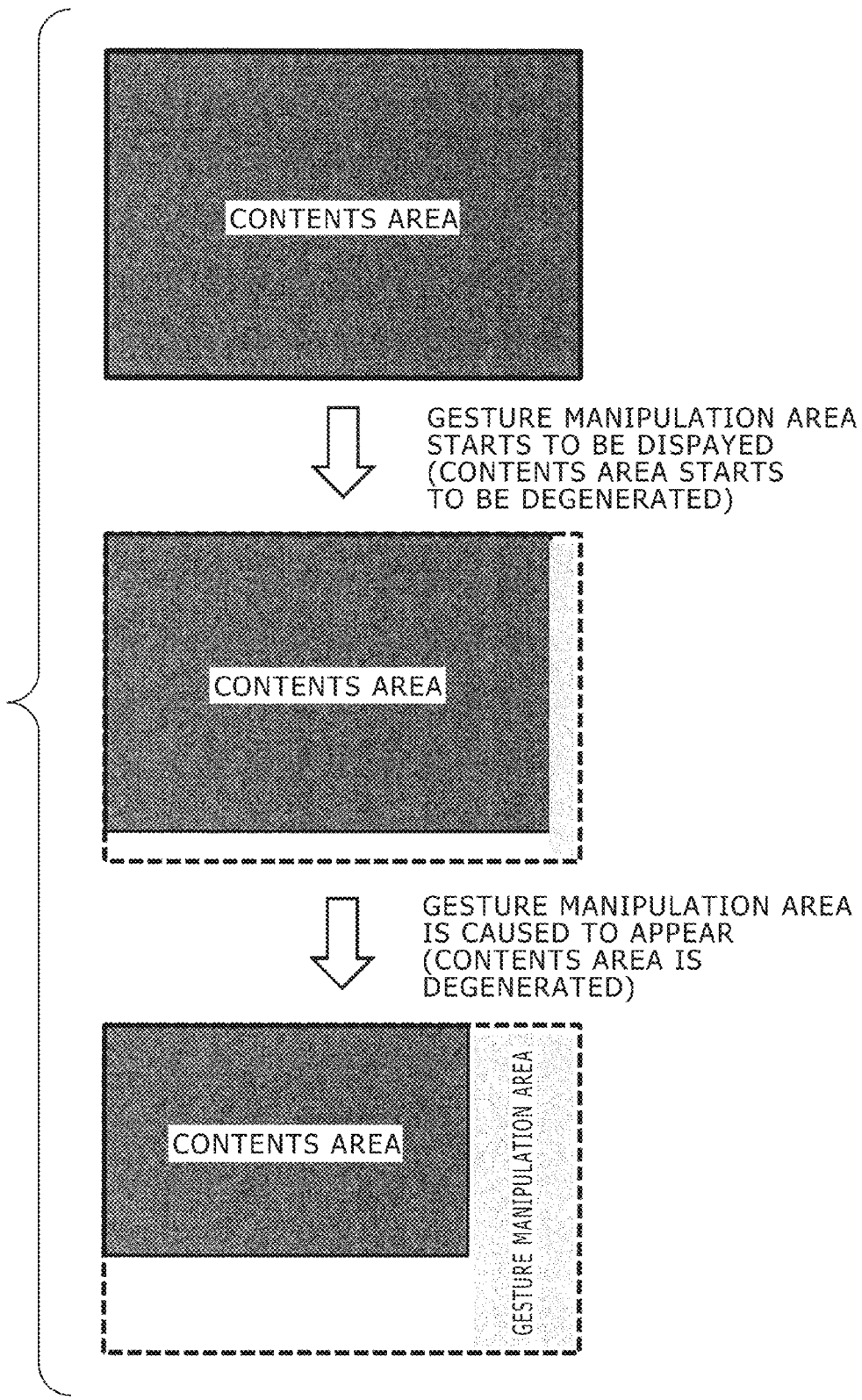
FIG. 15 is a view showing a situation in which a contents area is degenerated in response to that the gesture manipulation area is caused to appear.

FIG. 15 shows a situation in which the contents area is going to be degenerated in correspondence to the fact that the gesture manipulation area has been caused to appear. Preferably, the contents area after having been degenerated has the same aspect ratio as that of the original contents area.

Figure 16A:
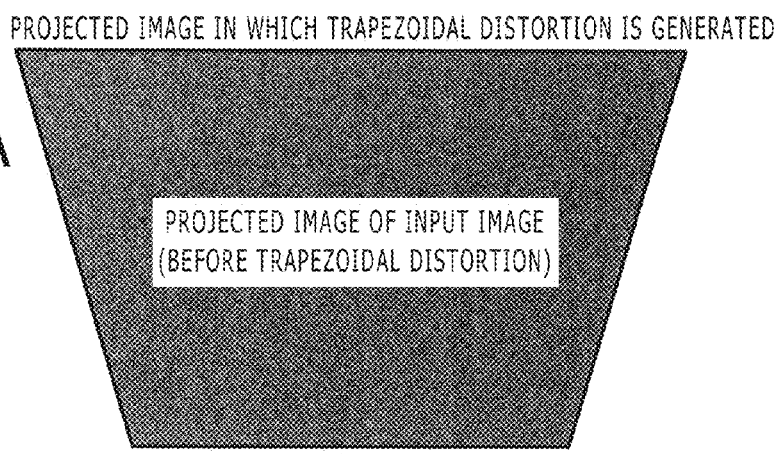
FIGS. 16A to 16C are respectively views explaining a method of utilizing an area on which an image for which a trapezoidal distortion has been corrected as the gesture manipulation area.
Figure 16B:
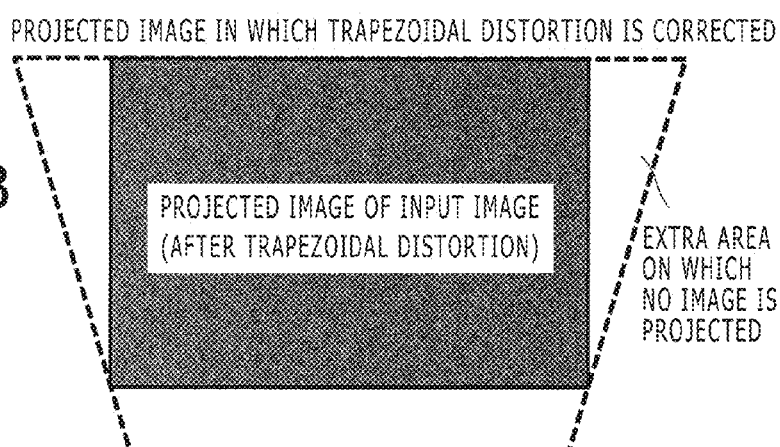
Figure 16C:
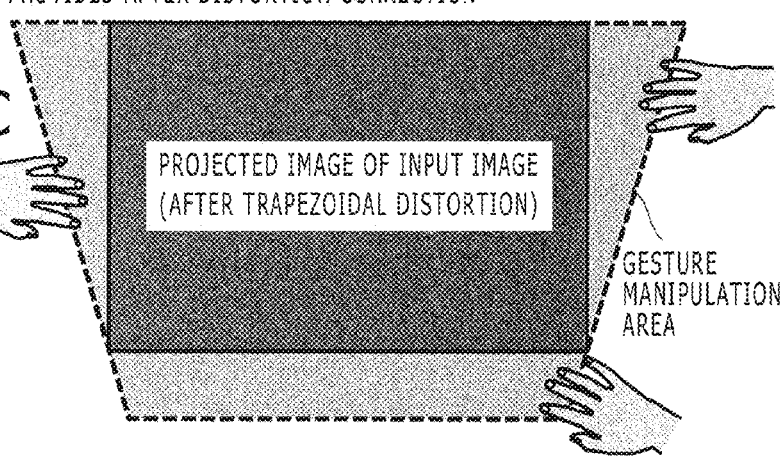

In addition, in the projection type image display apparatus 100, when a light is radiated obliquely from the projecting portion 101 to the image projected body, as shown in FIG. 16A, a projected image is obtained in which the trapezoidal distortion is generated. In general, as shown in FIG. 16B, the original image (the input image inputted through the input/output interface 103) is subjected to the projection transform, thereby carrying out the correction for the trapezoidal distortion in the projected image. This technique, for example, is described in Patent Document 3. As can be seen from FIG. 16B, for the correction for the trapezoidal distortion, the image is projected on the image projected body in the state in which the gesture manipulation area is degenerated from the trapezoid-shaped projectable area of the projecting portion 101. When the design is carried out in such a way that the projectable area of the projecting portion 101 becomes approximately equal to the photographing area of the camera portion 104, the correction for the trapezoidal distortion in the projected image is carried out and as a result, an extra area is generated in the photographing area. Thus, as shown in FIG. 16C, the gesture recognizing unit 122 may utilize the area, after the trapezoidal distortion has been carried out, on which the image is not projected on the image projected body as the gesture manipulation area.

In the description until now, no reference has been especially made to the number of users who carry out the manipulations in the gesture manipulation area. The projection surface from the projecting portion 101 becomes the larger picture than that of the general display device, and thus the projection surface becomes easy to share among plural users.

Figure 17A:
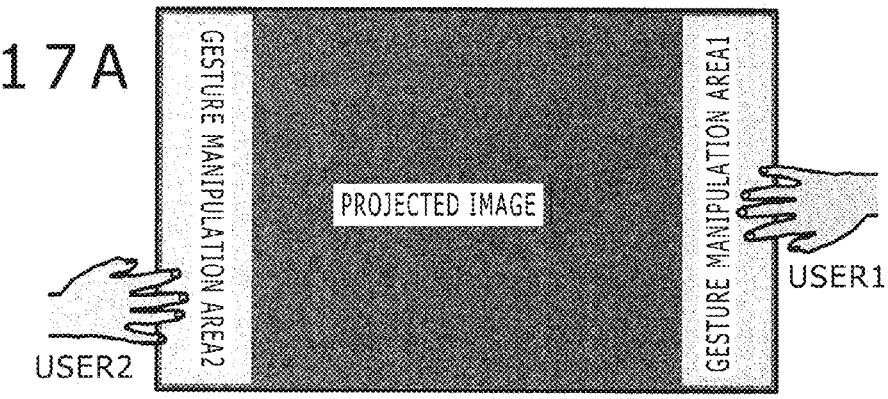
FIGS. 17A to 17C are respectively views showing a situation in which plural users carry out gesture manipulations at the same time on the projected image.
Figure 17B:
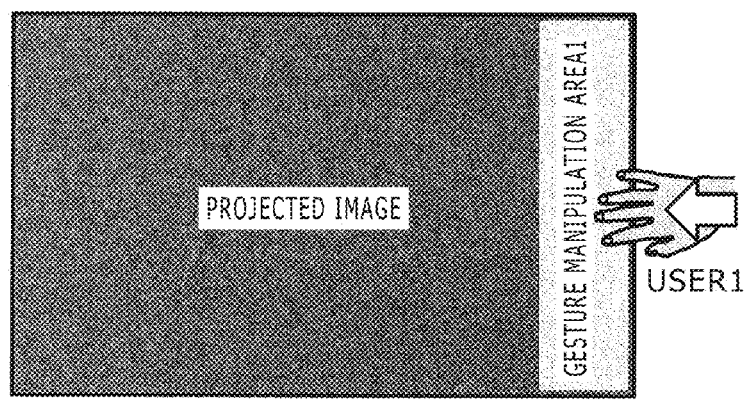
Figure 17C:
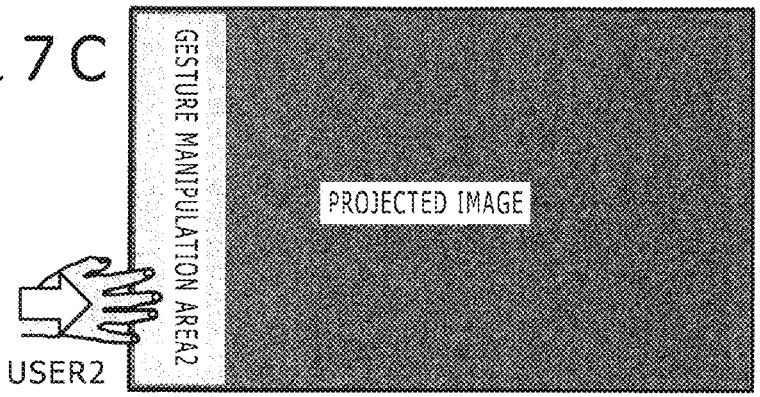

FIGS. 17A to 17C respectively show a situation in which plural users carry out the gesture manipulations, respectively, at the same time on the projected image. In the case shown in the figure, a user 1 carries out the gesture manipulation on the right-hand side of the projected image, and a user 2 carries out the gesture manipulation on the left-hand side of the projected image. In addition, a gesture manipulation area 1 for the user 1 is provided on the right-hand side of the projected image, and a gesture manipulation area 2 for the user 2 is provided on the left-hand side of the projected image. The gesture manipulation areas 1 and 2 may be caused to appear in order in response to the fact that the hands of the users 1 and 2 have been detected based on the inter-frame difference.

In addition, plural users who utilize the projected image by the projection type image display apparatus 100 at the same time does not work individually, but can also carry out the cooperative work.

Figure 18A:
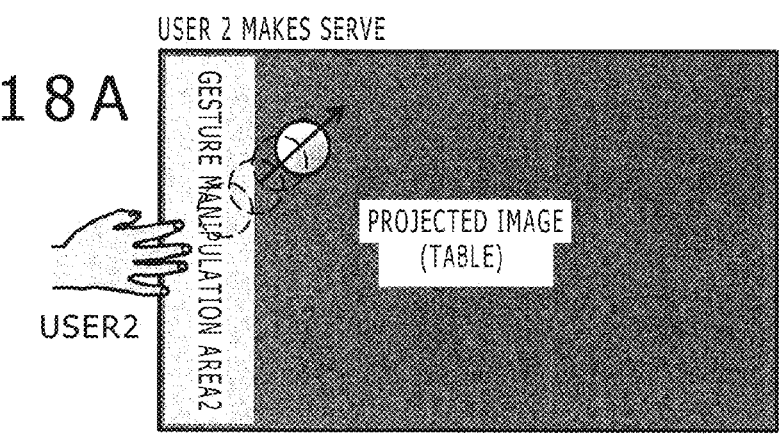
FIGS. 18A to 18C are respectively views showing a situation in which plural users carry out a collaborative work on the projected image.
Figure 18B:
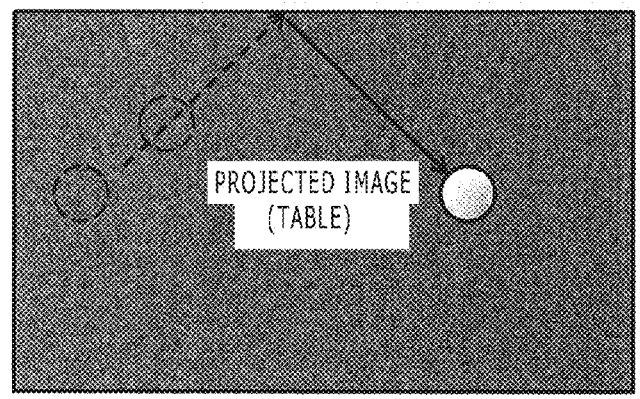
Figure 18C:
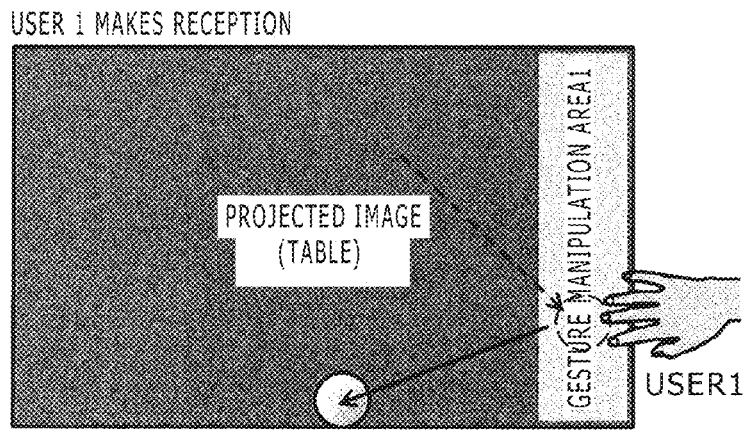

FIGS. 18A to 18C respectively show a situation in which the users 1 and 2 have a game with each other by utilizing the projected image as an example of the cooperative work by plural users. In the example shown in the figure, the users 1 and 2 enjoy a hockey game together on the projected image in which a table is displayed. In this case, the gesture manipulation areas 1 and 2 successively appear in response to the fact that the hands of the users 1 and 2 have been detected based on the inter-frame difference. Also, when the gesture recognizing unit 122 reads out the movement distance, the movement direction, and the movement speed at which each of the hands of the users 1 and 2 gives chase to a puck coming toward his/her own ground on the gesture manipulation areas 1 and 2, and then calculates a direction and a speed at which each of the users 1 and 2 hits the puck. Also, the display control block 110 draws the motion of the puck on the table based on the calculation results.

As described above, according to the projection type image display apparatus 100 of the first embodiment, unspecified persons can carry out the gesture manipulations on the large picture projected from the projecting portion 101.

In accordance with a computer program according to a second embodiment of the present disclosure which is described in a computer-readable form, a computer is caused to function as the projecting portion 101, the camera portion 104, the display control block 110, and the gesture recognizing unit 122. In this case, the projecting portion 101 projects the input image on the image projected body. The camera portion 104 photographs the image projected body. The display control block 110 controls the display of the projected image projected by the projecting portion 101. Also, the gesture recognizing unit 122 recognizes the gesture manipulation of the user contained in the image photographed by the camera portion 104 (refer to FIG. 1).

It is noted that the technique of the present disclosure can also adopt the following constitutions.

(1) A projection type image display apparatus including: a projecting portion projecting an input image on an image projected body; a camera portion photographing the image projected body; a display control block controlling display of a projected image projected by the projecting portion; and a gesture recognizing unit recognizing a gesture manipulation of a user contained in the image photographed by the camera portion.

(2) The projection type image display apparatus described in the paragraph (1), in which the camera portion photographs a projection surface of the projecting portion every predetermined time interval; and the gesture recognizing unit recognizes the gesture manipulation carried out on the projection surface based on a differential image obtained through an inter-frame difference between the photographed images for each of the predetermined time intervals.

(3) The projection type image display apparatus described in the paragraph (1), in which the display control block provides a gesture manipulation area within a photographing area of the camera portion.

(4) The projection type image display apparatus described in the paragraph (3), in which the display control block forms the gesture manipulation area for which gain correction is carried out or which is made approximately a write image within the photographed image; and the gesture recognizing unit searches for a hand shape and recognizes the gesture within the gesture manipulation area.

(5) The projection type image display apparatus described in the paragraph (3), in which the display control block provides the gesture manipulation area in response to that the gesture recognizing unit detects a change within the frames of the photographed image.

(6) The projection type image display apparatus described in the paragraph (3), in which the display control block causes the gesture manipulation area to disappear either when the gesture manipulation area is provided, and the hand shape is not detected within a predetermined period of time or when the gesture is not detected.

(7) The projection type image display apparatus described in the paragraph (1), in which the display control block causes visual information representing that the gesture recognizing unit recognizes the hand shape to be displayed within the projected image.

(8) The projection type image display apparatus described in the paragraph (1), in which the display control block causes visual information representing that the gesture recognizing unit ends processing for recognizing the gesture manipulation to be displayed within the projected image.

(9) The projection type image display apparatus described in the paragraph (3), in which the display control block carries out guide display representing a gesture manipulating method within the gesture manipulation area.

(10) The projection type image display apparatus described in the paragraph (3), in which the display control block usually provides the gesture manipulation area within the photographing area of the camera portion when a moving image is projected by the projecting portion.

(11) The projection type image display apparatus described in the paragraph (10), in which the display control block displays the gesture manipulation area composed of a still image so as to superimpose the gesture manipulation area on the moving image.

(12) The projection type image display apparatus described in the paragraph (3), in which when the display of the gesture manipulation area is carried out, the display control block degenerates a projection size of the input image so as to prevent the input image from overlapping the gesture manipulation area.

(13) The projection type image display apparatus described in the paragraph (3), in which the display control block carries out the display of the gesture manipulation area by utilizing an extra area, after the input image is projected from the projecting portion, of an area which is adapted to be projected on the image projected body by the projecting portion.

(14) The projection type image display apparatus described in the paragraph (3), further including an image correction amount calculating unit calculating an image correction amount with which a distortion when the input image is projected on the image projected body from the projecting portion based on the image photographed by the camera body, in which the display control block corrects the input image based on the image correction amount; and the gesture recognizing unit uses a portion on which the input image after the correction is not projected as the gesture manipulation area.

(15) A projection type image displaying method, including: projecting an input image on an image projected body; photographing the projected body; and recognizing a gesture manipulation of a user contained in a photographed image obtained in the photographing.

(16) A computer program described in a computer-readable form so as to cause a computer to function as: a projecting portion projecting an input image on an image projected body; a camera portion photographing the image projected body; a display control block controlling display of a projected image projected by the projecting portion; and a gesture recognizing unit recognizing a gesture manipulation of a user contained in the image photographed by the camera portion.

The technique disclosed in this specification has been described in detail so far while reference is made to the specific embodiments. However, it is obvious that those skilled in the art can make modifications and substitutions without departing from the subject matter of the technique disclosed in this specification.

In this specification, the description has been given with respect to the embodiments about the projection type image display apparatus integrated with the camera. However, even in the case where a constitution is adopted in such a way that the camera either can be separated from the main body of the projection type image display apparatus or is externally connected to the main body, similarly, the technique disclosed in this specification can also be applied to such a constitution.

In a word, the technique disclosed in this specification has been described in the form of the exemplifications, and thus the contents described in this specification should not be intended to be construed in a limited sense. For the purpose of determining the subject matter of the technique disclosed in this specification, the appended claims should be taken into consideration.

The present disclosure contains subject matter related to that disclosed in Japanese Priority Patent Application JP 2012-132658 filed in the Japan Patent Office on Jun. 12, 2012, the entire content of which is hereby incorporated by reference.

What is claimed is:

1. A projection type image display apparatus, comprising:
a projecting portion configured to project an input image on an image projected body;
a camera portion configured to photograph a plurality of images of the image projected body at respective time intervals;
an image correction amount calculating unit configured to calculate an image correction amount of the projected input image;
a control block configured to:
control display of the projected input image; and
correct a distortion in the projected input image based on the image correction amount to obtain a corrected input image; and a gesture recognizing unit configured to:
  detect a change between a plurality of frames of the photographed plurality of images for the respective time intervals; and
  recognize a gesture manipulation on a projection surface of the projecting portion,
    wherein the gesture manipulation corresponds to a user contained in a photographed first image of the plurality of images; and
  provide a gesture manipulation area based on the detection of the change between the plurality of frames of the photographed plurality of images for the respective time intervals,
    wherein the gesture manipulation area corresponds to a portion of the image projected body on which the corrected input image is prevented from projection; and
  display a guide display area within the gesture manipulation area,
    wherein the guide display area guides the recognized gesture manipulation that corresponds to the user in an orientation, and
    wherein the orientation is one of a counterclockwise orientation or a downward orientation.

2. The projection type image display apparatus according to claim 1, wherein
  the gesture recognizing unit is further configured to recognize the gesture manipulation on the projection surface of the projecting portion based on a differential image, wherein the differential image is obtained based on the change between the plurality of frames of the photographed plurality of images for the respective time intervals.

3. The projection type image display apparatus according to claim 1, wherein the gesture manipulation area is within a photographing area of the camera portion.

4. The projection type image display apparatus according to claim 1, wherein
  the control block is further configured to provide the gesture manipulation area for which gain is corrected or which is made as a white image within the photographed first image, and
  the gesture recognizing unit is further configured to search for a hand shape of a hand of the user and recognize the gesture manipulation within the gesture manipulation area.

5. The projection type image display apparatus according to claim 1, wherein
  the control block is further configured to cause the gesture manipulation area to disappear based on one of:
  a first determination that the gesture manipulation area is provided, and a hand shape is undetected within a period of time, or
  a second determination that the gesture manipulation is undetected.

6. The projection type image display apparatus according to claim 1,
  wherein the control block is further configured to control display of visual information within the projected input image,
  wherein the visual information indicates recognition of a hand of the user by the gesture recognizing unit.

7. The projection type image display apparatus according to claim 1,
  wherein the control block is further configured to control display of visual information within the projected input image,
  wherein the visual information indicates completion of recognition of the gesture manipulation by the gesture recognizing unit.

8. The projection type image display apparatus according to claim 1, wherein the control block is further configured to provide the gesture manipulation area within a photographing area of the camera portion based on a projection of a moving image of the plurality of images by the projecting portion.

9. The projection type image display apparatus according to claim 8, wherein the control block is further configured to display the gesture manipulation area composed of a still image so that the gesture manipulation area is superimposed on the moving image.

10. The projection type image display apparatus according to claim 1, wherein the control block is further configured to degenerate a projection size of the input image so that an overlap of the input image with the gesture manipulation area is prevented based on the display of the gesture manipulation area.

11. The projection type image display apparatus according to claim 1, wherein the control block is further configured to control display of the gesture manipulation area based on utilization of an extra area which is adapted to be projected on the image projected body by the projecting portion.

12. The projection type image display apparatus according to claim 1,
  wherein the distortion is generated based on the projection of the input image obliquely on the image projected body from the projecting portion,
  wherein the distortion is a trapezoidal distortion, and
  wherein the image correction amount is calculated based on the photographed first image.

13. A projection type image displaying method, comprising:
  projecting an input image on an image projected body;
  photographing a plurality of images of the image projected body at respective time intervals;
  calculating an image correction amount of the projected input image;
  correcting a distortion in the projected input image based on the calculated image correction amount to obtain a corrected input image;
  detecting a change between a plurality of frames of the photographed plurality of images for the respective time intervals;
  recognizing a gesture manipulation on a projection surface of a projecting portion,
    wherein the gesture manipulation corresponds to a user contained in a photographed first image of the plurality of images;
  providing a gesture manipulation area based on the detection of the change between the plurality of frames of the photographed plurality of images for the respective time intervals,
    wherein the gesture manipulation area corresponds to a portion of the image projected body on which the corrected image is prevented from projection; and
  displaying a guide display area within the gesture manipulation area,
    wherein the guide display area guides the recognized gesture manipulation that corresponds to the user in an orientation, and
    wherein the orientation is one of a counterclockwise orientation or a downward orientation.

14. A non-transitory computer-readable medium having stored thereon, computer-executable instructions that cause a computer to execute operations, the operations comprising:
- projecting an input image on an image projected body;
- photographing a plurality of images of the image projected body at respective time intervals;
- calculating an image correction amount of the projected input image;
- correcting a distortion in the projected input image based on the calculated image correction amount to obtain a corrected input image;
- detecting a change between a plurality of frames of the photographed plurality of images for the respective time intervals;
- recognizing a gesture manipulation on a projection surface of a projecting portion,
    - wherein the gesture manipulation corresponds to a user contained in a photographed first image of the plurality of images; and
- providing a gesture manipulation area based on the detection of the change between the plurality of frames of the photographed plurality of images for the respective time intervals,
    - wherein the gesture manipulation area corresponds to a portion of the image projected body on which the corrected image is prevented from projection; and
- displaying a guide display area within the gesture manipulation area,
- wherein the guide display area guides the recognized gesture manipulation that corresponds to the user in an orientation, and
- wherein the orientation is one of a counterclockwise orientation or a downward orientation.

15. The projection type image display apparatus according to claim 1,
- wherein the gesture recognizing unit is further configured to recognize a plurality of gesture manipulations of a plurality of users,
- wherein the plurality of gesture manipulations are contained concurrently in the photographed first image.

16. The projection type image display apparatus according to claim 15,
- wherein the control block is further configured to concurrently provide a plurality of gesture manipulation areas within the projected input image,
- wherein each of the plurality of gesture manipulation areas corresponds to the recognized plurality of gesture manipulations.

17. The projection type image display apparatus according to claim 1,
- wherein the gesture recognizing unit is further configured to recognize a plurality of gesture manipulations of a plurality of users,
- wherein the plurality of gesture manipulations are contained in the photographed first image.

18. The projection type image display apparatus according to claim 17,
- wherein the control block is further configured to provide a plurality of gesture manipulation areas which correspond to the recognized plurality of gesture manipulations,
- wherein the plurality of gesture manipulation areas successively appear within the projected input image based on the recognition of the plurality of gesture manipulations.

* * * * *